(12) United States Patent
Akifusa et al.

(10) Patent No.: US 7,834,895 B2
(45) Date of Patent: Nov. 16, 2010

(54) STORAGE MEDIUM STORING GAME PROGRAM, AND GAME DEVICE

(75) Inventors: Yusuke Akifusa, Kyoto (JP); Kenichi Nishida, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 450 days.

(21) Appl. No.: 11/633,612

(22) Filed: Dec. 5, 2006

(65) Prior Publication Data

US 2008/0088645 A1     Apr. 17, 2008

(30) Foreign Application Priority Data

Oct. 17, 2006    (JP)   ............................ 2006-283112

(51) Int. Cl.
     *G09G 5/00*        (2006.01)

(52) U.S. Cl. ........................ 345/636; 345/582; 345/589; 345/592; 345/619; 345/638; 345/473; 345/474; 382/291; 463/33

(58) Field of Classification Search ................... 345/638
See application file for complete search history.

(56) References Cited

U.S. PATENT DOCUMENTS

| | | | | |
|---|---|---|---|---|
| 6,234,901 B1 * | 5/2001 | Nagoshi et al. | ................ | 463/33 |
| 7,382,373 B2 * | 6/2008 | Baxter et al. | ................. | 345/473 |
| 2006/0055700 A1 * | 3/2006 | Niles et al. | ................... | 345/473 |
| 2006/0077210 A1 * | 4/2006 | Morris et al. | ................ | 345/613 |

FOREIGN PATENT DOCUMENTS

JP        2000-298733       10/2000

* cited by examiner

*Primary Examiner*—Antonio A Caschera
(74) *Attorney, Agent, or Firm*—Nixon & Vanderhye P.C.

(57) ABSTRACT

Trace shape information, representing the shape of a trace along which an object has moved across a game field in a virtual game world is updated based on the change in the position where the object is located in the virtual game world. A ground texture is produced by blending together an image of the game field in the virtual game world with the trace and that without the trace based on the trace shape information. The game field in the virtual game world is rendered by using the ground texture. Then, the virtual game world, in which the object has been placed, is displayed on a display device.

14 Claims, 15 Drawing Sheets

F I G. 4
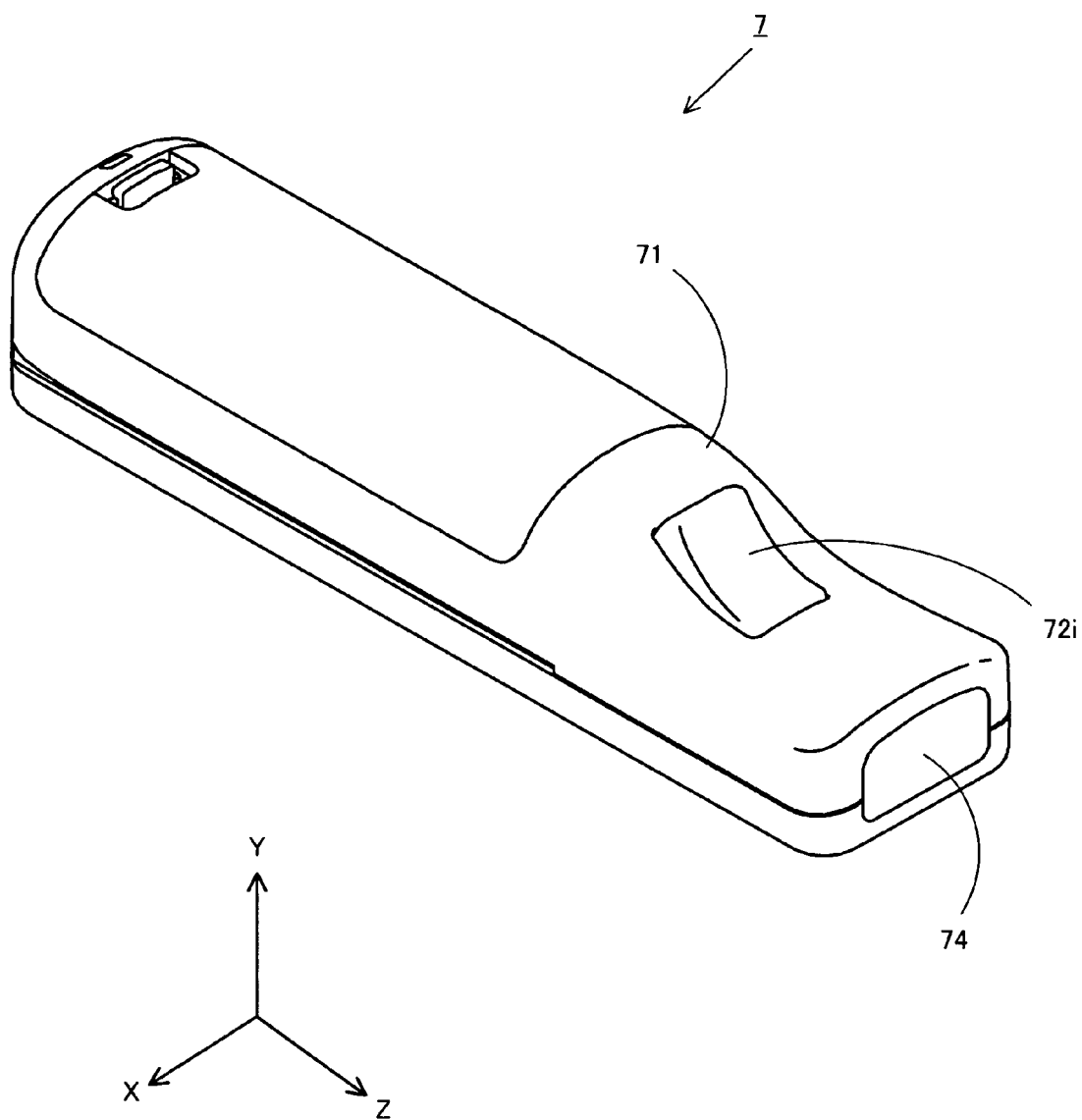

F I G. 8
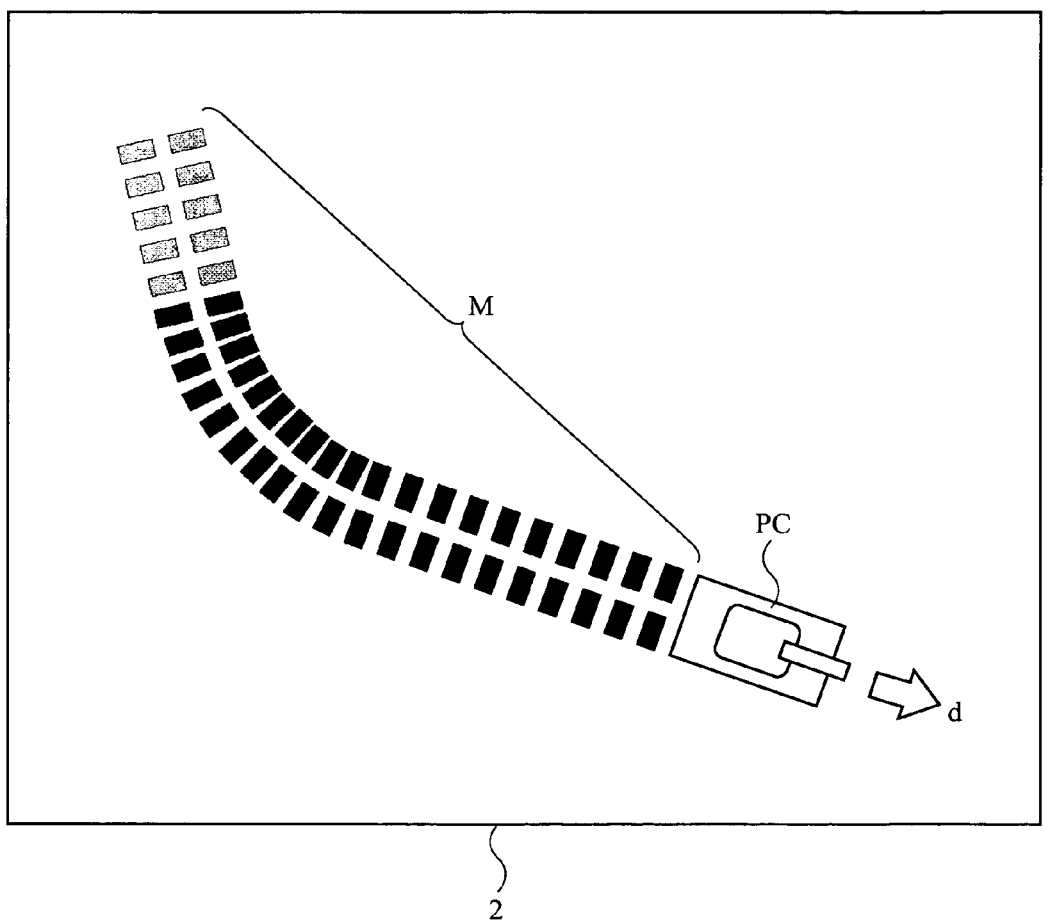

STORAGE MEDIUM STORING GAME PROGRAM, AND GAME DEVICE

CROSS REFERENCE TO RELATED APPLICATION

The disclosure of Japanese Patent Application No. 2006-283112, filed on Oct. 17, 2006, is incorporated herein by reference.

TECHNICAL FIELD

Certain exemplary embodiments disclosed herein relate to a storage medium storing a game program and a game device and, more particularly, to a storage medium storing a game program and a game device for a video game in which an object is moved around in a virtual game world.

BACKGROUND AND SUMMARY

Japanese Laid-Open Patent Publication No. 2000-298733 (hereinafter referred to as Patent Document 1), for example, discloses a game device in which the trace of the movement of an object is displayed as the object is moved around in a virtual game world. With the game device, the trace (path) of the movement of the object in the virtual game space is rendered with polygons, and the color of each portion of the trace is lightened gradually with time until that portion disappears, whereby portions of the trace that are closer to the rear end thereof are lighter in color.

However, the game device disclosed in Patent Document 1 requires more polygons to be rendered for displaying longer traces in the virtual game space, thus needing to reserve a memory space for the polygons. Therefore, the maximum length of the trace to be displayed is limited by the processing speed of the game device and the allotted memory size.

Therefore, a feature of certain exemplary embodiments is to provide a storage medium storing a game program and a game device for displaying a trace of the movement of an object with no limitation on the maximum length of the trace to be displayed.

Certain exemplary embodiments described herein have the following aspects to attain the feature mentioned above. Note that parenthetic expressions in the following section (reference numerals, step numbers, etc.) are merely to indicate the correlation between what is described in the following section and what is described in the detailed description set out further below in the present specification, and are in no way intended to restrict the scope of the certain exemplary embodiments described herein.

A first aspect of certain exemplary embodiments is directed to a storage medium storing a game program to be executed by a computer (30) of a game device (5) for displaying, on a display device (2), an object (PC) moved around in a virtual game world. The game program instructs the computer to perform an object position calculation step (the CPU 30 performing step 15; hereinafter only the step numbers will be shown), a trace shape information updating step (S46), a ground texture producing step (S51), a game field rendering step (S52), an object placement step (S15), and a display control step (S53, S13). The object position calculation step is a step of calculating a position (Db) of the object in the virtual game world. The trace shape information updating step is a step of updating trace shape information (Tsa) representing a shape of a trace (M) along which the object has moved across a game field in the virtual game world based on a change in the calculated position, and storing the updated trace shape information in a memory (33). The ground texture producing step is a step of producing a ground texture (Tc) by blending together an image (Tt) of the game field in the virtual game world with the trace and that (Tg) without the trace based on the trace shape information. The game field rendering step is a step of rendering the game field in the virtual game world by using the ground texture. The object placement step is a step of placing the object at the calculated position. The display control step is a step of displaying the virtual game world in which the object has been placed on the display device.

In a second aspect based on the first aspect, the object position calculation step, the trace shape information updating step, the ground texture producing step, the game field rendering step, and the display control step are repeated by the computer on a predetermined processing cycle.

In a third aspect based on the first aspect, the trace shape information indicates a blending ratio at which the image of the game field with the trace is blended with that without the trace.

In a fourth aspect based on the third aspect, in the trace shape information updating step, the trace shape information is updated while the blending ratio at which the image of the game field with the trace is blended is lowered for portions of the trace that have already been rendered and displayed on the display device.

In a fifth aspect based on the first aspect, the trace shape information indicates an area where the image of the game field with the trace is blended with that without the trace.

In a sixth aspect based on the fifth aspect, the trace shape information further indicates a blending ratio at which the image of the game field with the trace is blended in the area.

In a seventh aspect based on the sixth aspect, in the trace shape information updating step, the trace shape information is updated while the blending ratio at which the image of the game field with the trace is blended is lowered for portions of the trace that have already been rendered and displayed on the display device.

In an eighth aspect based on the first aspect, the trace shape information is image data such that an area of the game field where the trace is present is represented in a first color (black) and an area of the game field where the trace is absent is represented in a second color (white) different from the first color, and the blending ratio at which the image of the game field with the trace is blended with that without the trace is represented in terms of a strength of the first color.

A ninth aspect of certain exemplary embodiments is directed to a game device for displaying an object moved around in a virtual game world on a display device. The game device includes the object position calculation means, the trace shape information updating means, the ground texture producing means, the game field rendering means, the object placement means, and the display control means. The object position calculation means is means for calculating a position of the object in the virtual game world. The trace shape information updating means is means for updating trace shape information representing a shape of a trace along which the object has moved across a game field in the virtual game world based on a change in the calculated position, and storing the updated trace shape information in the storage means. The ground texture producing means is means for producing a ground texture by blending together an image of the game field in the virtual game world with the trace and that without the trace based on the trace shape information. The game field rendering means is means for rendering the game field in the virtual game world by using the ground texture. The object placement means is means for placing the object at the calculated position. The display control means is means for displaying the virtual game world in which the object has been placed on the display device.

In a tenth aspect based on the ninth aspect, the processes performed by the object position calculation means, the trace shape information updating means, the ground texture producing means, the game field rendering means, and the display control means are repeated on a predetermined processing cycle.

In an eleventh aspect based on the ninth aspect, the trace shape information indicates a blending ratio at which the image of the game field with the trace is blended with that without the trace.

In a twelfth aspect based on the eleventh aspect, the trace shape information updating means updates the trace shape information while the blending ratio at which the image of the game field with the trace is blended is lowered for portions of the trace that have already been rendered and displayed on the display device.

In a thirteenth aspect based on the ninth aspect, the trace shape information indicates an area where the image of the game field with the trace is blended with that without the trace.

In a fourteenth aspect based on the ninth aspect, the trace shape information further indicates a blending ratio at which the image of the game field with the trace is blended in the area.

In a fifteenth aspect based on the fourteenth aspect, the trace shape information updating means updates the trace shape information while the blending ratio at which the image of the game field with the trace is blended is lowered for portions of the trace that have already been rendered and displayed on the display device.

In a sixteenth aspect based on the ninth aspect, the trace shape information is image data such that an area of the game field where the trace is present is represented in a first color and an area of the game field where the trace is absent is represented in a second color different from the first color, and the blending ratio at which the image of the game field with the trace is blended with that without the trace is represented in terms of a strength of the first color.

According to the first aspect, before the virtual game world is rendered, only the trace is rendered, and the rendered trace is made into a texture, which is displayed while being blended with the ground. Therefore, the processing speed and the memory cost required for rendering the trace can be kept constant, irrespective of the size of the trace to be rendered. Moreover, the ground texture is produced by blending together two different images of the game field, whereby it is possible to produce the ground that fits the game field.

According to the second aspect, the trace rendering process is repeated, whereby the trace can be updated and appropriately rendered as the object moves around.

According to the third aspect, the ratio at which the image of the game field with the trace is blended can be controlled, whereby the shade of the trace can be expressed on the game field.

According to the fifth aspect, it is possible, using the trace shape information, to render a trace according to the path along which the object has passed.

According to the sixth aspect, it is possible, using the trace shape information, to render a trace according to the path along which the object has passed, while expressing the shade thereof on the game field.

According to the fourth or seventh aspect, the color of each portion of the trace is lightened gradually with time until that portion disappears.

According to the eighth aspect, the trace shape information can be realized as image data such that the trace shape is displayed in a first color (e.g., black) and the area other than the trace is displayed in a second color (e.g., white), and the shade of the trace is represented in terms of the strength of the first color.

With the game device of certain exemplary embodiments, effects similar to those of the storage medium storing a game program can be obtained.

These and other objects, features, aspects and advantages of the certain exemplary embodiments will become more apparent from the following detailed description when taken in conjunction with the accompanying drawings.

BRIEF DESCRIPTION OF THE DRAWINGS

FIG. 4 is a perspective view showing the controller 7 of FIG. 3 as viewed from the lower rear side;

FIG. 8 shows an exemplary game image to be displayed on a display screen of a monitor 2 of FIG. 1;

DETAILED DESCRIPTION

Figure 1:
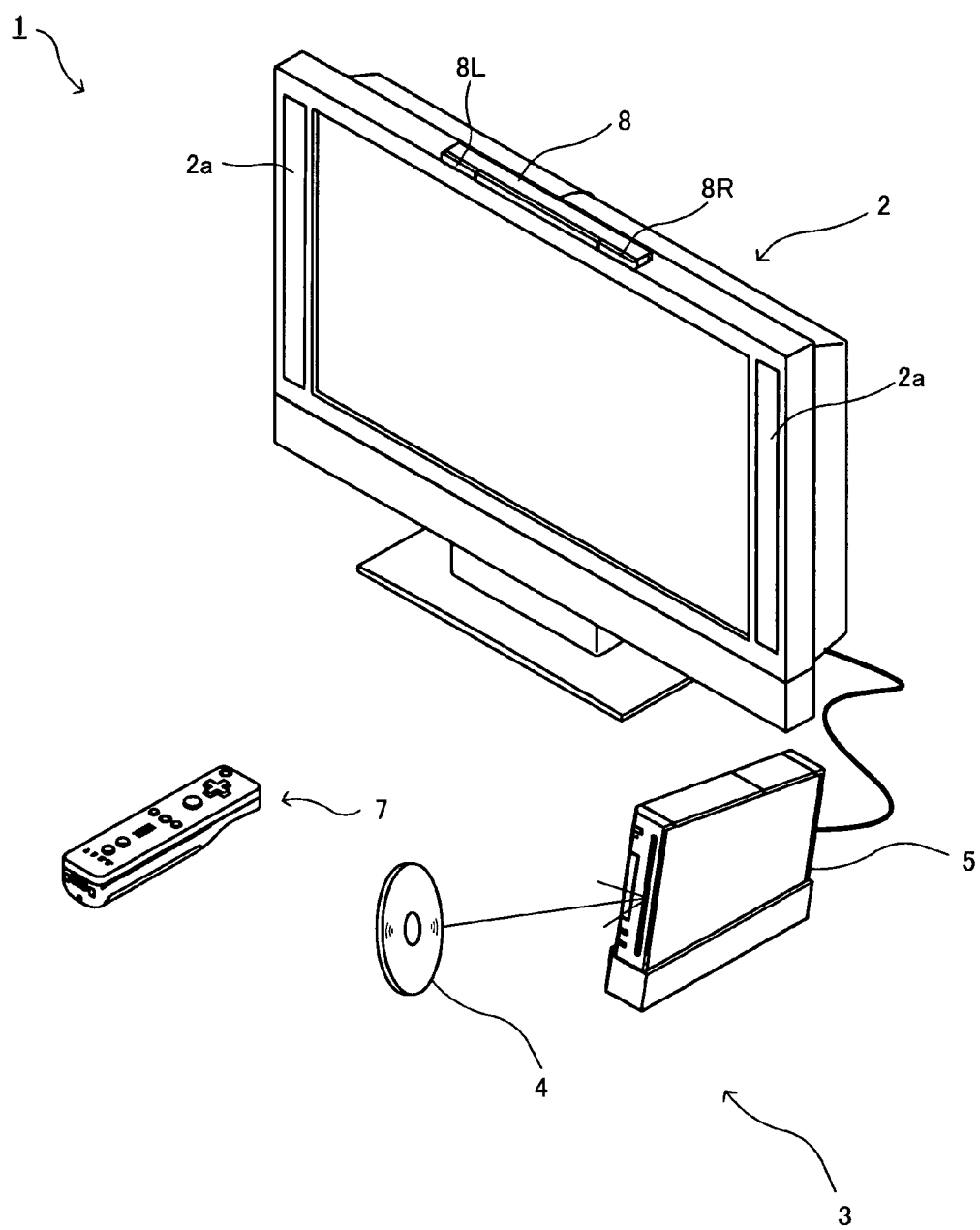
FIG. 1 is an external view showing a game system 1 in one exemplary embodiment.
Figure 2:
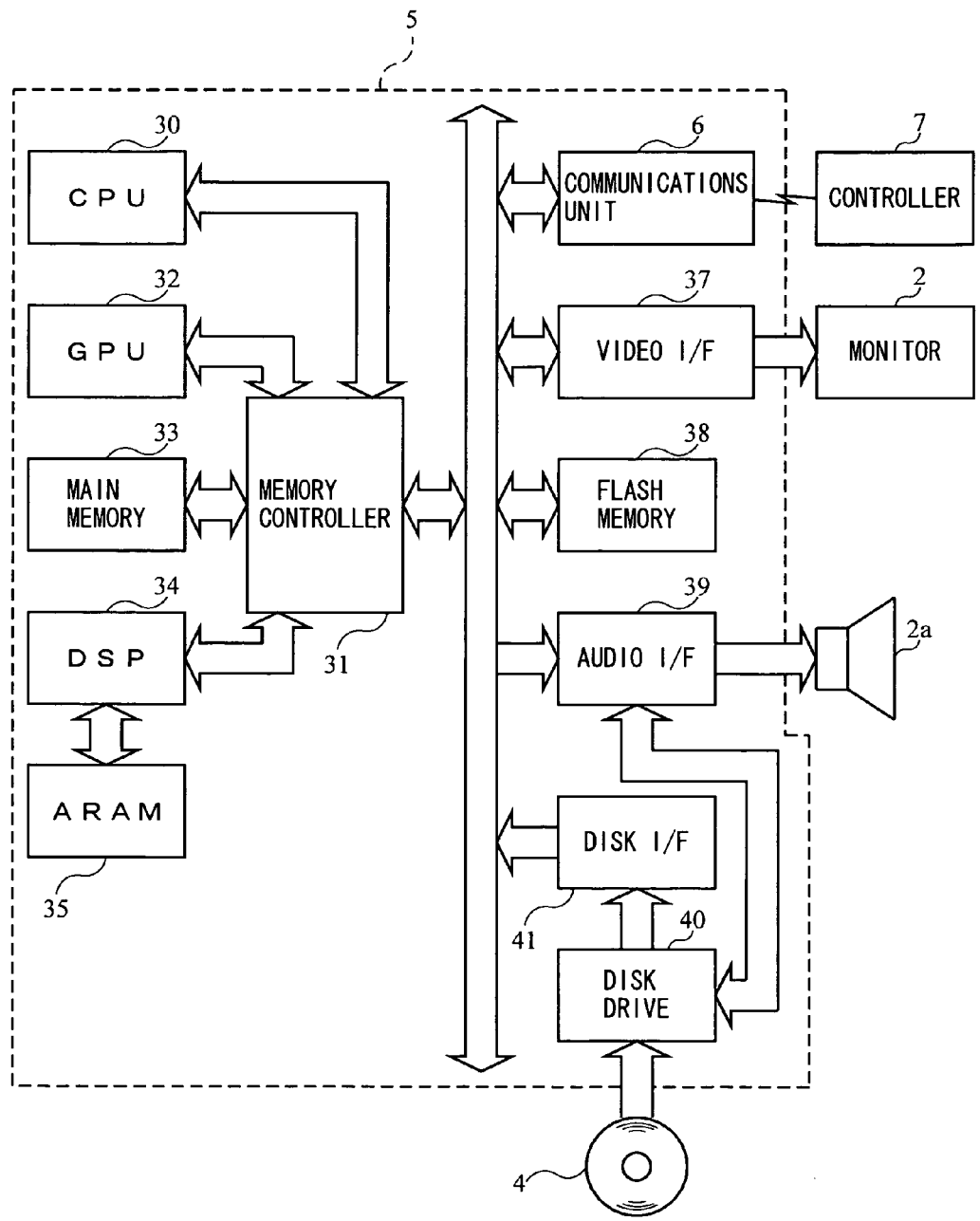
FIG. 2 is a functional block diagram of a game device main unit 5 of FIG. 1.

Referring to FIG. 1, a game device according to one exemplary embodiment will be described. A game system including a home-console type game device, being an example of the game device, will now be described as a certain exemplary embodiment. FIG. 1 is an external view of a game system 1 including a home-console type game device 3, and FIG. 2 is a block diagram of a game device main unit 5. The game system 1 will now be described.

Referring to FIG. 1, the game system 1 includes a home television receiver (hereinafter "monitor") 2 being an example of the display means, and a home-console type game device 3 connected to the monitor 2 via a connection cord. The monitor 2 includes a speaker 2a for outputting a sound signal received from the game device main unit 5. The game device 3 includes an optical disc 4, the game device main unit 5 and a controller 7. The optical disc 4 stores a game program of certain exemplary embodiments. The game device main unit 5 includes a computer for executing the game program on the optical disc 4 to display a game screen on the monitor 2. The controller 7 gives the game device main unit 5 control information, which is used for controlling a game character, etc., displayed on the game screen.

The game device main unit 5 includes a communications unit 6 therein. The communications unit 6 receives data wirelessly transmitted from the controller 7 and transmits data from the game device main unit 5 to the controller 7, and the controller 7 and the game device main unit 5 are connected via wireless communications. The game device main unit 5 includes the optical disc 4, being an example of an information storage medium that can be received by the game device main unit 5. Provided on the front principal plane of the game device main unit 5 are an ON/OFF switch for turning ON/OFF the game device main unit 5, a reset switch for resetting a game process, a slot for receiving the optical disc 4, an eject switch for ejecting the optical disc 4 out of the slot of the game device main unit 5, etc.

The game device main unit 5 also includes a flash memory 38 serving as a backup memory for statically storing save data, or the like. The game device main unit 5 executes a game program, or the like, stored in the optical disc 4 to obtain a game image, and displays the obtained game image on the monitor 2. The game device main unit 5 may reproduce a past game status from save data stored in the flash memory 38 to obtain a game image for that past game status, and display the obtained game image on the monitor 2. Then, the player of the game device main unit 5 can enjoy the game process by operating the controller 7 while watching the game image displayed on the monitor 2.

The controller 7 wirelessly transmits transmit data such as control information to the game device main unit 5 including the communications unit 6 therein by means of a technique such as Bluetooth (registered trademark), for example. The controller 7 is control means for controlling primarily a player character, or the like, to be present in the game space displayed on the display screen of the monitor 2. The controller 7 includes a housing of such a size that the controller 7 can be held in one hand, and a plurality of control buttons (including a cross-shaped key, a stick, etc.) exposed on the surface of the housing. As will be more apparent from the following description, the controller 7 includes an image capturing/processing section 74 for capturing an image as viewed from the controller 7. As an example of imaging targets to be captured by the image capturing/processing section 74, two LED modules (hereinafter "markers") 8L and 8R are provided around the display screen of the monitor 2. The markers 8L and 8R output infrared light to the front side of the monitor 2. Alternatively, the controller 7 can receive, at a communications section 75 thereof, the transmit data wirelessly transmitted from the communications unit 6 of the game device main unit 5, thereby generating a sound or a vibration according to the transmit data.

Referring to FIG. 2, the game device main unit 5 includes a CPU (Central Processing Unit) 30, for example, for executing various programs. The CPU 30 executes a boot program stored in a boot ROM (not shown), thus initializing memory devices, such as a main memory 33, and then executes a game program stored in the optical disc 4 to perform a game process, etc., according to the game program. Connected to the CPU 30 via a memory controller 31 are a GPU (Graphics Processing Unit) 32, the main memory 33, a DSP (Digital Signal Processor) 34, an ARAM (Audio RAM) 35, etc. The memory controller 31 is connected, via a predetermined bus, to the communications unit 6, a video I/F (interface) 37, the flash memory 38, an audio I/F 39 and a disk I/F 41, which are connected to the monitor 2, the speaker 2a and a disk drive 40, respectively.

The GPU 32 is responsible for image processing based on instructions from the CPU 30, and is a semiconductor chip, for example, capable of computations necessary for 3D graphics display. The GPU 32 performs the image process by using a memory dedicated for image processing (not shown) or a part of the memory area of the main memory 33. The GPU 32 produces game image data or movie data to be displayed on the monitor 2 using these memory areas, and outputs the produced data to the monitor 2 via the memory controller 31 and the video I/F 37 as necessary.

The main memory 33 is a memory area used by the CPU 30, and stores a game program, etc., as necessary for processes performed by the CPU 30. For example, the main memory 33 stores the game program loaded from the optical disc 4 by the CPU 30 and various data, etc. The game program, the various data, etc., stored in the main memory 33 are executed or processed by the CPU 30.

The DSP 34 is for processing sound data, etc., produced by the CPU 30 when executing the game program, and is connected to the ARAM 35 for storing the sound data, etc. The ARAM 35 is used when the DSP 34 performs a predetermined process (e.g., storing a game program, sound data, etc., which have been loaded in advance). The DSP 34 reads out the sound data stored in the ARAM 35, and outputs the sound data through the speaker 2a provided in the monitor 2 via the memory controller 31 and the audio I/F 39.

The memory controller 31 is responsible for the overall control of data transfers, and is connected to the various I/F's described above. As described above, the communications unit 6 receives transmit data from the controller 7, and outputs the transmit data to the CPU 30. The communications unit 6 transmits the transmit data outputted from the CPU 30 to the communications section 75 of the controller 7. The monitor 2 is connected to the video I/F 37. The speaker 2a provided in the monitor 2 is connected to the audio I/F 39 so that the sound data read out from the ARAM 35 by the DSP 34 or the sound data outputted directly from the disk drive 40 can be outputted through the speaker 2a. The disk drive 40 is connected to the disk I/F 41. The disk drive 40 reads out data from the optical disc 4 placed in a predetermined read-out position, and outputs the data to the bus or the audio I/F 39 of the game device main unit 5.

Figure 3:
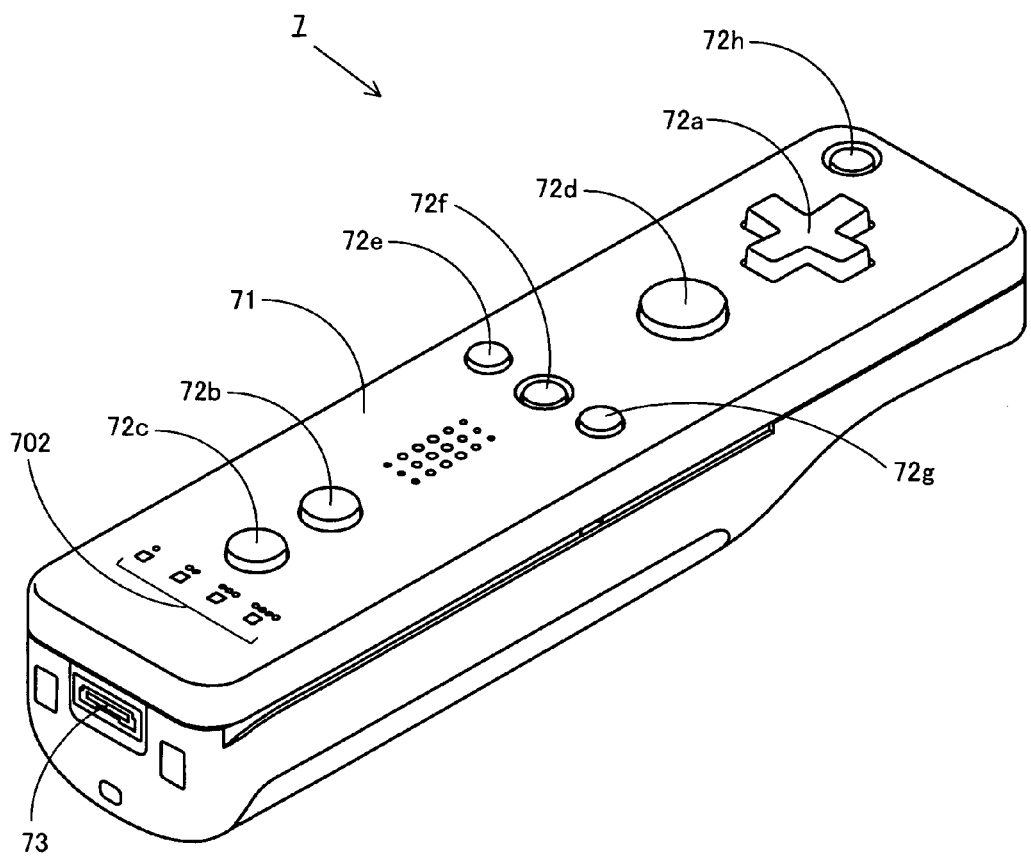
FIG. 3 is a perspective view showing a controller 7 of FIG. 1 as viewed from the upper rear side.

Referring now to FIGS. 3 and 4, the controller 7 will be described. FIG. 3 is a perspective view showing the controller 7 as viewed from the upper rear side. FIG. 4 is a perspective view showing the controller 7 as viewed from the lower front side.

The controller 7 shown in FIGS. 3 and 4 includes a housing formed by molding a plastic material, for example, with a plurality of control sections 72 provided on the housing 71. The housing 71 has a generally rectangular parallelepiped shape, with the longitudinal direction being the front-rear direction, and has an overall size such that it can be held in a hand of an adult or a child.

A cross-shaped key 72a is provided on the upper surface of the housing 71, centered in the left-right direction and near the front end. The cross-shaped key 72a is a cross-shaped four-way push switch, in which four control portions associated with four different directions (forward, backward, left and right) are provided in the protruding portions of the cross shape while being spaced apart from one another by 90°. The player can select one of the forward, backward, left and right directions by pressing down a corresponding one of the control portions of the cross-shaped key 72a. For example, the player can control the cross-shaped key 72a to move a player character, etc., in a virtual game world in a certain direction, or make a selection from among a plurality of options.

While the cross-shaped key 72a is a control section that outputs an operation signal according to a direction input operation by the player, it may be any other suitable type of a control section. For example, the control section may include four push switches arranged in a cross-shaped pattern so as to output an operation signal according to the push switch being pressed by the player. Alternatively, in addition to the four push switches, a center switch may be provided at the center of the cross-shaped push switch arrangement, thus providing a control section including four push switches combined with a center switch. Alternatively, the cross-shaped key 72a may be replaced by a stick-shaped control section (so-called a "joy stick") protruding from the upper surface of the housing 71, which outputs an operation signal according to the direction in which it is tilted. Alternatively, the cross-shaped key 72a may be replaced by a horizontally-movable (slidable) disc-shaped control section, which outputs an operation signal according to the direction in which it is slid. Alternatively, the cross-shaped key 72a may be replaced by a touch pad.

A plurality of control buttons 72b to 72g are provided on the upper surface of the housing 71, closer to the rear end with respect to the cross-shaped key 72a. The control buttons 72b to 72g are control sections, each of which outputs an operation signal associated therewith when being pressed by the player. For example, the control buttons 72b to 72d may be assigned a function as a first button, a second button and an A button, respectively. For example, the control buttons 72e to 72g may be assigned a function as a minus button, a home button and a plus button, respectively. Each of the control buttons 72a to 72g is assigned a function as specified in the game program executed by the game device main unit 5. In the arrangement shown in FIG. 3, the control buttons 72b to 72d are arranged in the forward-backward direction while being centered in the left-right direction on the upper surface of the housing 71. The control buttons 72e to 72g are arranged in the left-right direction between the control buttons 72b and 72d on the upper surface of the housing 71. The control button 72f is buried under the upper surface of the housing 71 so as to prevent the player from pressing the button unintentionally.

A control button 72h is provided on the upper surface of the housing 71, closer to the front end with respect to the cross-shaped key 72a. The control button 72h is a power switch for remotely turning ON/OFF the power of the game device main unit 5 from a remote position. The control button 72h is also buried under the upper surface of the housing 71 so as to prevent the player from pressing the button unintentionally.

A plurality of LEDs 702 are provided on the upper surface of the housing 71, closer to the rear end with respect to the control button 72c. The controller 7 is given a controller ID (number) for identifying the controller 7 from others. The LEDs 702 may, for example, be used for notifying the player of the controller ID being currently assigned to the controller 7. Specifically, when transmit data is transmitted from the controller 7 to the communications unit 6, one or more of the LEDs 702 are lit depending on the controller ID.

Sound slits are formed in the upper surface of the housing 71 between the control button 72b and the control buttons 72e to 72g for allowing the sound from a speaker (a speaker 706 in FIG. 5) to be described later to pass therethrough.

A depressed portion is formed on the lower surface of the housing 71. The depressed portion of the lower surface of the housing 71 is located where the index or middle finger of the player lies when the player holds the controller 7 from the front side thereof aiming toward the markers 8L and 8R. A control button 72i is provided on a slope on the rear side of the depressed portion. For example, the control button 72i is a control section that functions as a B button.

An image sensing device 743, forming a part of the image capturing/processing section 74, is formed on the front side of the housing 71. The image capturing/processing section 74 is a system for analyzing image data obtained by the controller 7 to determine each spot with high luminance and then to detect the centroid and the size thereof, and has a maximum sampling frequency of about 200 frames per second, for example, and is thus capable of following fast movements of the controller 7. The details of the configuration of the image capturing/processing section 74 will be described later. A connector 73 is provided on the rear side of the housing 71. The connector 73 is, for example, an edge connector, and is used for connection between the controller 7 and a connection cable, which can be fitted into the connector 73.

Figure 5:
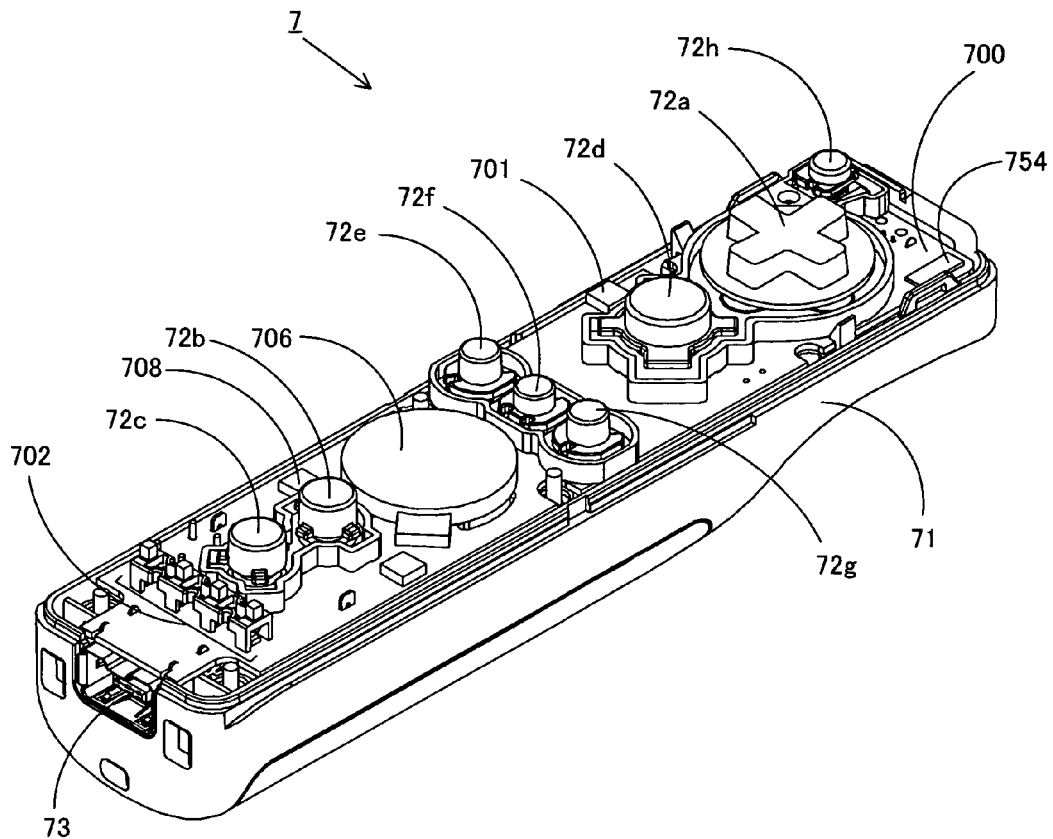
FIG. 5 is a perspective view showing the controller 7 of FIG. 3 with an upper casing taken off.
Figure 5:
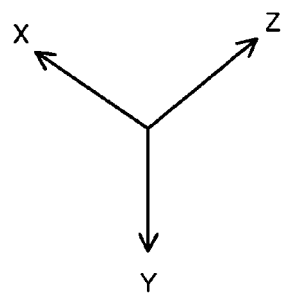
Figure 6:
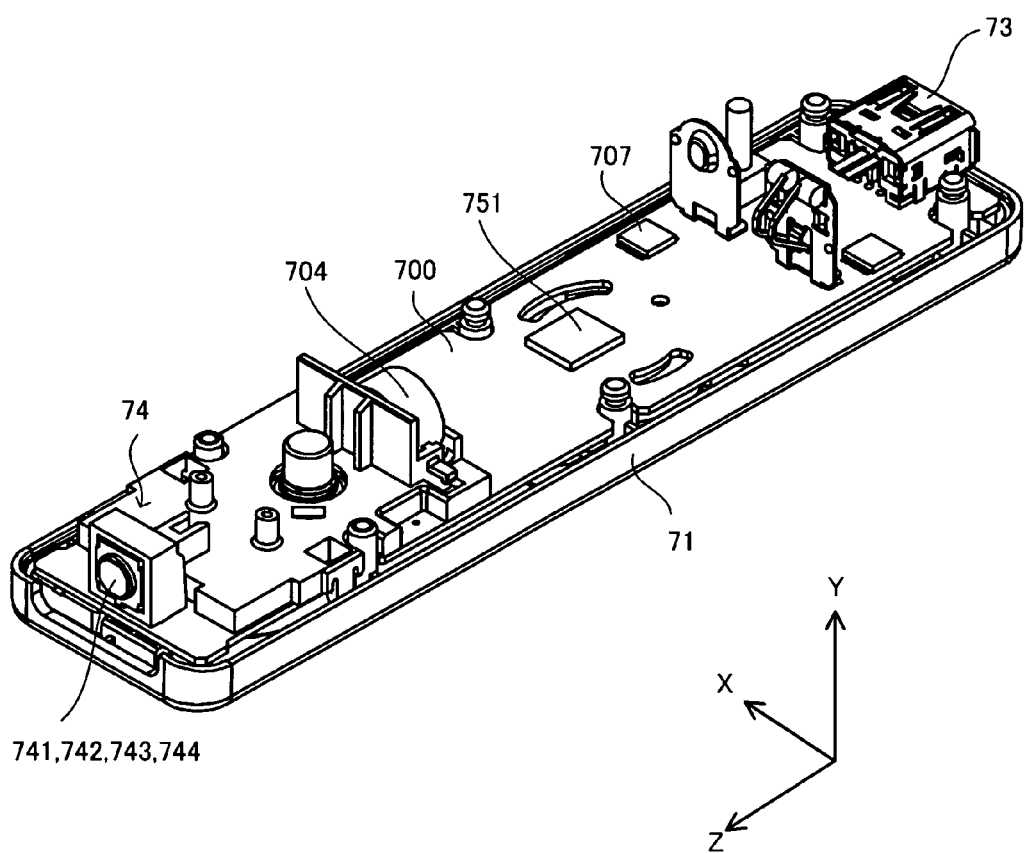
FIG. 6 is a perspective view showing the controller 7 of FIG. 4 with a lower casing taken off.

Referring now to FIGS. 5 and 6, an internal configuration of the controller 7 will be described. FIG. 5 is a perspective view showing the controller 7 with an upper casing (a part of the housing 71) taken off, as viewed from the rear side. FIG. 6 is a perspective view showing the controller 7 with a lower casing (a part of the housing 71) taken off, as viewed from the front side. FIG. 5 shows one side of a substrate 700, and FIG. 6 shows the other side thereof.

In FIG. 5, the substrate 700 is secured in the housing 71, and the control buttons 72a to 72h, an acceleration sensor 701, the LEDs 702, an antenna 754, etc., are provided on the upper principal plane of the substrate 700. These components are connected to a microcomputer 751 (see FIGS. 6 and 7), etc., via lines (not shown) formed on the substrate 700, etc. With a wireless module 753 (not shown in FIGS. 5 and 6; see FIG. 7) and the antenna 754, the controller 7 can function as a wireless controller. A quartz oscillator 703 (not shown in FIGS. 5 and 6) is provided inside the housing 71, and generates a basic clock for the microcomputer 751 to be described later. The speaker 706 and an amplifier 708 are provided on the principal surface of the substrate 700. The acceleration sensor 701 is provided on the left side of the control button 72d on the substrate 700 (i.e., in a peripheral portion, but not a central portion, of the substrate 700). Therefore, as the controller 7 rotates about an axis in the longitudinal direction, the acceleration sensor 701 can detect the acceleration including a centrifugal component, in addition to the change in the direction of the gravitational acceleration, whereby the game device main unit 5, etc., can determine, with a desirable sensitivity, the rotation of the controller 7 based on the detected acceleration data by using a predetermined calculation.

Referring to FIG. 6, the image capturing/processing section 74 is provided at the front edge on the lower principal plane of the substrate 700. The image capturing/processing section 74 includes an infrared filter 741, a lens 742, the image sensing device 743 and an image processing circuit 744 provided in this order from the front side of the controller 7, and these components are provided on the lower principal plane of the substrate 700. The connector 73 is provided at the rear edge on the lower principal plane of the substrate 700. A sound IC 707 and the microcomputer 751 are provided on the lower principal surface of the substrate 700. The sound IC 707 is connected to the microcomputer 751 and the amplifier 708 via a line formed on the substrate 700, etc., and outputs a sound signal to the speaker 706 via the amplifier 708 according to sound data transmitted from the game device main unit 5.

A vibrator 704 is attached to the lower principal surface of the substrate 700. The vibrator 704 may be, for example, a vibrating motor or a solenoid. The vibrator 704 is connected to the microcomputer 751 via a line formed on the substrate 700, etc., and is turned ON/OFF based on the vibration data transmitted from the game device main unit 5. As the vibrator 704 is actuated, the controller 7 is vibrated, and the vibration is transmitted to the hand of the player holding the controller 7, thus realizing a video game with vibration feed back. The vibrator 704 is positioned slightly closer to the front edge of the housing 71, whereby the housing 71 can vibrate more powerfully while the housing 71 is being held by the player, who is thus more likely to feel the vibration.

Figure 7:
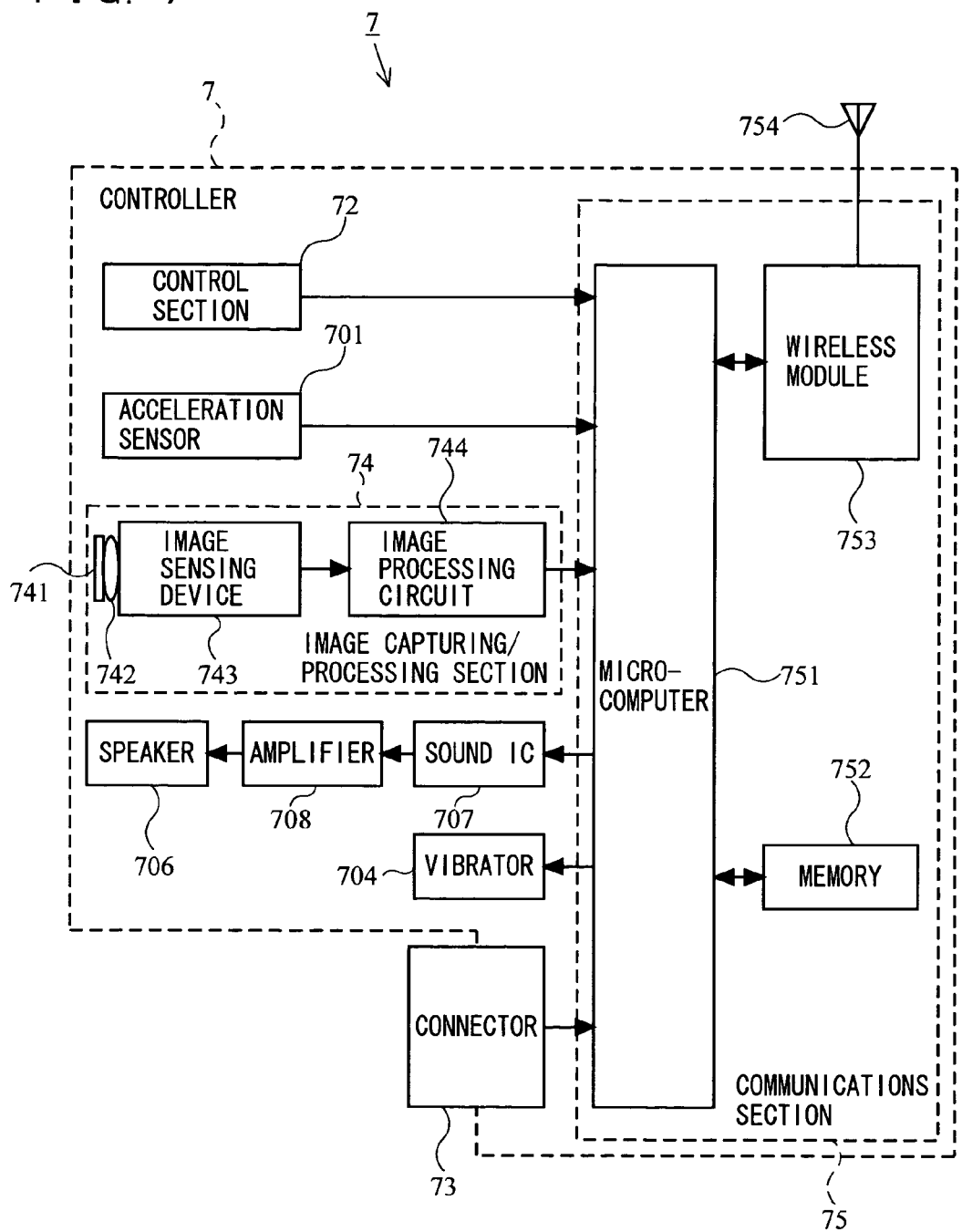
FIG. 7 is a block diagram showing a configuration of the controller 7 of FIG. 3.

Referring now to FIG. 7, an internal configuration of the controller 7 will be described. FIG. 7 is a block diagram showing a configuration of the controller 7.

Referring to FIG. 7, in addition to the control section 72, the image capturing/processing section 74, the acceleration sensor 701, the vibrator 704, the speaker 706, the sound IC 707 and the amplifier 708, the controller 7 includes therein the communications section 75.

The image capturing/processing section 74 includes the infrared filter 741, the lens 742, the image sensing device 743 and the image processing circuit 744. The infrared filter 741 passes only an infrared portion of incident light entering the controller 7 from the front side. The lens 742 condenses the infrared light passing through the infrared filter 741, and outputs the condensed infrared light to the image sensing device 743. The image sensing device 743 is a solid-state image sensing device, such as a CMOS sensor or a CCD, for capturing the infrared light condensed through the lens 742. Therefore, the image sensing device 743 produces image data by capturing only the infrared light that has passed through the infrared filter 741. The image data produced by the image sensing device 743 is processed in the image processing circuit 744. Specifically, the image processing circuit 744 processes the image data obtained from the image sensing device 743 to detect high-luminance portions and obtain positions and areas thereof, and the image processing circuit 744 outputs the process result data representing the obtained positions and areas to the communications section 75. The image capturing/processing section 74 is secured in the housing 71 of the controller 7, and the image-capturing direction can be changed by changing the direction of the housing 71 itself.

According to certain exemplary embodiments the controller 7 includes a 3-axis (X, Y and Z) acceleration sensor 701. The acceleration sensor 701 detects the linear acceleration in each of three directions, i.e., the up-down direction (the Y axis direction shown in FIG. 3), the left-right direction (the X axis direction shown in FIG. 3) and the forward-backward direction (the Z axis direction shown in FIG. 3). For example, the acceleration sensor 701 may be of the type available from Analog Devices, Inc., or STMicroelectronics N.V. The acceleration sensor 701 is preferably a capacitance type (capacitance-coupling type) sensor based on the technique of MEMS (MicroElectroMechanical Systems) using a silicon microfabrication process. However, the acceleration sensor 701 may be provided by other existing acceleration detection means (e.g., a piezoelectric sensor or a piezoelectric resistance sensor) or any suitable technique to be developed in the future.

Acceleration detection means of a type that is used as the acceleration sensor 701 is capable of detecting only an acceleration along a straight line corresponding to each of the axes of the acceleration sensor 701 (linear acceleration). Thus, the output directly from the acceleration sensor 701 is a signal representing the linear acceleration (static or dynamic) along each of the three axes. Therefore, the acceleration sensor 701 cannot directly detect a physical property, e.g., the movement, rotation, revolution, angular displacement, inclination, position or orientation, along a non-linear (e.g., arc-shaped) path.

However, it will be readily understood by those skilled in the art upon reading the present embodiment that other information regarding the controller 7 can be estimated or calculated (determined) through an additional operation on an acceleration signal outputted from the acceleration sensor 701. For example, if a static acceleration (gravitational acceleration) is detected, it is possible to determine the inclination of the object (the controller 7) with respect to the gravity vector based on a calculation with the inclination angle and the detected acceleration using the output from the acceleration sensor 701. Thus, by using the acceleration sensor 701 in combination with the microcomputer 751 (or another processor such as the CPU 30 included in the game device main unit 5), it is possible to determine the inclination, orientation or position of the controller 7. Similarly, when the controller 7 including the acceleration sensor 701 is moved while being dynamically accelerated with a hand of the player, it is possible to calculate various movements and/or positions of the controller 7 by processing the acceleration signal produced by the acceleration sensor 701. In other embodiments, the acceleration sensor 701 may include a built-in or otherwise dedicated signal processing device for performing a desired operation on the acceleration signal outputted from the acceleration detection means provided in the acceleration sensor 701, before outputting the signal to the microcomputer 751. For example, where the acceleration sensor 701 is for detecting a static acceleration (e.g., the gravitational acceleration), the built-in or dedicated signal processing device may be a device for converting the detected acceleration signal to a corresponding inclination angle (or other preferable parameters). Acceleration data detected by the acceleration sensor 701 is outputted to the communications section 75.

The communications section 75 includes the microcomputer 751, a memory 752, the wireless module 753 and the antenna 754. The microcomputer 751 controls the wireless module 753 for wirelessly transmitting transmit data while using the memory 752 as a memory area. Moreover, the microcomputer 751 controls the sound IC 707 and the vibrator 704 according to the data from the game device main unit 5 received by the wireless module 753 via the antenna 754. The sound IC 707 processes sound data, etc., transmitted from the game device main unit 5 via the communications section 75. The microcomputer 751 controls the vibrator 704 according to vibration data (e.g., a signal for turning ON/OFF the vibrator 704), etc., transmitted from the game device main unit 5 via the communications section 75.

An operation signal (key data) from the control section 72 provided in the controller 7, acceleration signals for the three axis directions (the X-, Y- and Z-axis direction acceleration data) from the acceleration sensor 701 and process result data from the image capturing/processing section 74 are outputted to the microcomputer 751. The microcomputer 751 temporarily stores the received data (the key data, the X-, Y- and Z-axis acceleration data and the process result data) in the memory 752 as transmit data to be transmitted to the communications unit 6. Data are wirelessly transmitted from the communications section 75 to the communications unit 6 at regular intervals. Since the game process typically proceeds in a cycle of 1/60 second, the interval should be shorter than 1/60 second. Specifically, the game process proceeds in a cycle of 16.7 ms (1/60 second), and the data transmission interval of the communications section 75 using the Bluetooth (registered trademark) technique is 5 ms. When it is time to transmit data to the communications unit 6, the microcomputer 751 outputs, as a series of control information, transmit data stored in the memory 752 to the wireless module 753. The wireless module 753 uses a technique such as Bluetooth (registered trademark) to transform control information into a radio wave signal using a carrier of a predetermined frequency, and radiates the radio wave signal from the antenna 754. Thus, the key data from the control section 72 provided in the controller 7, the X-, Y- and Z-axis acceleration data from the acceleration sensor 701 and the process result data from the image capturing/processing section 74 are transmitted from the controller 7. The radio wave signal is received by the communications unit 6 of the game device main unit 5, and is demodulated and decoded by the game device main unit 5, thereby obtaining the series of control information (the key data, the X-, Y- and Z-axis acceleration data and the process result data). The CPU 30 of the game device main unit 5 performs the game process based on the obtained control information and the game program. Where the communications section 75 uses a Bluetooth (registered trademark) technique, the communications section 75 can also receive transmit data wirelessly transmitted from other devices.

As will be more apparent from the following description, the game program of certain exemplary embodiments can be realized only if the key data is transmitted, among all the data (the key data, the X-, Y- and Z-axis acceleration data and the process result data) transmitted as the transmit data. In such a case, the controller 7 does not have to be provided with the acceleration sensor 701 and the image capturing/processing section 74. Moreover, the controller 7 does not have to be provided with the function of outputting sound from the controller 7 (the speaker 706, the amplifier 708, the sound IC 707) and the function of vibrating the controller 7 (the vibrator 704).

The video game played with the game device main unit 5 will now be outlined with reference to FIG. 8, prior to the detailed description of the operation performed by the game device main unit 5. FIG. 8 shows an exemplary game image to be displayed on a display screen of the monitor 2.

Referring to FIG. 8, when the player moves a player character PC in a virtual game world, the trace M of the movement of the player character PC on the virtual ground is displayed on the display screen of the monitor 2. For example, the position of the player character PC in the virtual game world is specified by the key data transmitted from the controller 7. For example, the direction d in which the player character PC moves in the virtual game world may be determined according to the direction in which the player presses the cross-shaped key 72*a*, and the player character PC may move in the direction d at a constant speed.

The player character PC moves on the ground, which is defined in the virtual game world, and the trace M is rendered on the ground where the player character PC has passed. For example, where the player character PC is a tank object, the trace M may be a pair of caterpillar tracks rendered on the ground. The color of each portion of the trace M is lightened gradually with time until that portion disappears, whereby portions of the trace M that are closer to the rear end thereof are lighter in color. In FIG. 8, the trace M is rendered as a group of solid-color rectangles, with the ground of the virtual game world being rendered in white. The color of each rectangle of the trace M is gradually lightened with time from black to white.

Figure 9:
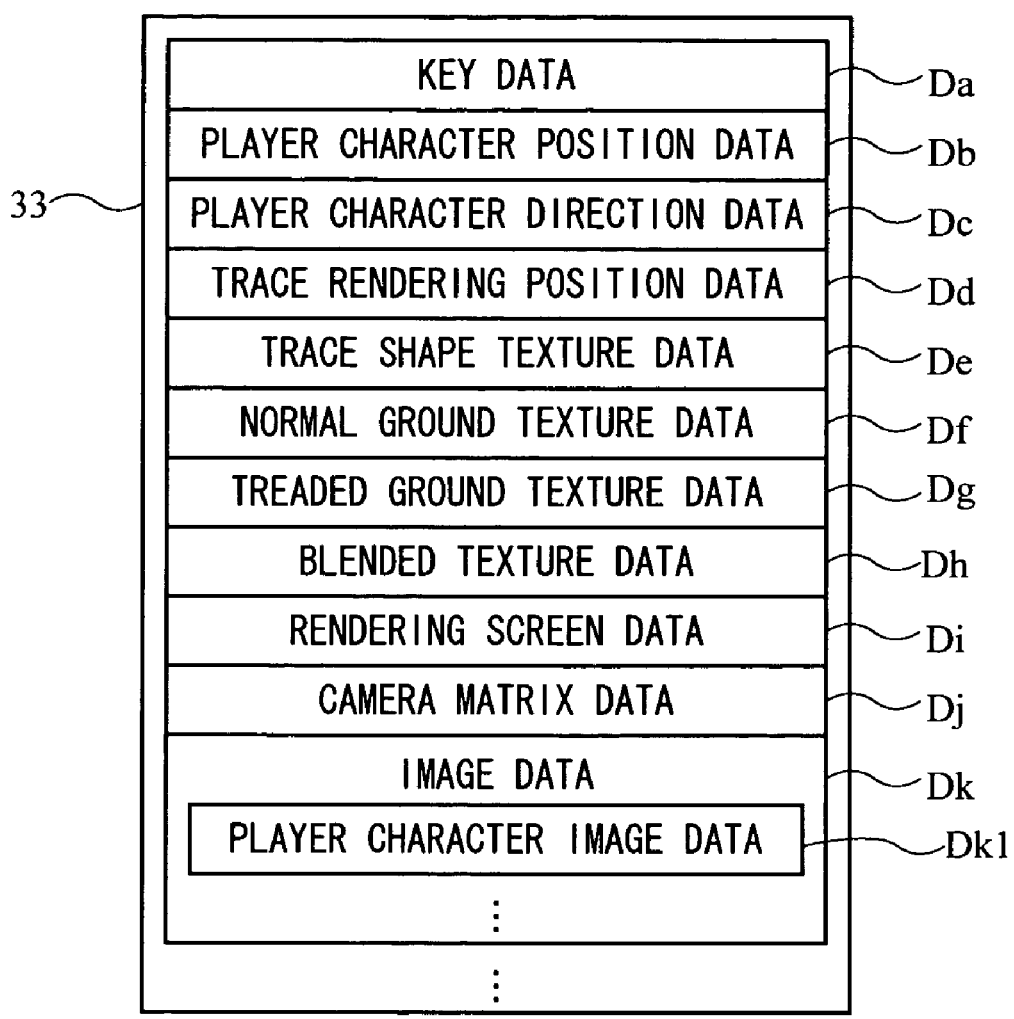
FIG. 9 shows important data to be stored in a main memory 33 of the game device main unit 5 of FIG. 1.

The details of the game process performed by the game system 1 will now be described. First, referring to FIG. 9, important data to be used in the game process will be described. FIG. 9 shows important data to be stored in the main memory 33 of the game device main unit 5.

Referring to FIG. 9, the main memory 33 stores key data Da, player character position data Db, player character direction data Dc, trace rendering position data Dd, trace shape texture data De, normal ground texture data Df, treaded ground texture data Dg, blended texture data Dh, rendering screen data Di, camera matrix data Dj, image data Dk, etc. In addition to those shown in FIG. 9, the main memory 33 also stores other data necessary for the game process, such as data regarding the player character PC and other objects to be in the game, and data regarding the virtual game space.

The key data Da is key data included in a series of control information transmitted from the controller 7 as transmit data. The communications unit 6 provided in the game device main unit 5 receives the control information transmitted from the controller 7 at a regular interval (e.g., 5 ms), and the received data are stored in a buffer (not shown) of the communications unit 6. The stored data is read out in a cycle of one frame (1/60 second), being the game process interval, and the key data Da in the main memory 33 is updated. Although the series of data transmitted from the controller 7 as the transmit data includes process result data and acceleration data, in addition to the key data, flow charts to be discussed below are directed to an embodiment where these data are not used.

The player character position data Db is coordinate data, for example, representing the position of the player character PC (see FIG. 8) in the virtual game world. The player character direction data Dc is vector data, for example, representing the direction of the player character PC in the virtual game world. The trace rendering position data Dd is coordinate data, for example, representing the last position in the virtual game world where the trace M (see FIG. 8) of the movement of the player character PC was rendered (i.e., the position of the front end of the trace M).

The trace shape texture data De is texture image data representing the shape and the shade of the trace M in the virtual game world. The normal ground texture data Df is texture image data representing the normal ground in the virtual game world. The treaded ground texture data Dg is texture image data representing a trace portion of the virtual game world. The blended texture data Dh is texture image data representing the ground with a trace thereon in the virtual game world, and is obtained by blending together the texture image data represented by the trace shape texture data De, the normal ground texture data Df and the treaded ground texture data Dg.

The rendering screen data Di stores rendering screens Sa and Sb, which are used for producing texture image data and for producing a game image to be displayed on the monitor 2. The camera matrix data Dj is data representing camera matrices C1 and C2, which define the state of a virtual camera when producing the rendering screens Sa and Sb.

The image data Dk is data, which is used for placing the player character PC, etc., in the virtual game space so as to produce a game image, and includes player character image data Dk1.

Figure 10:
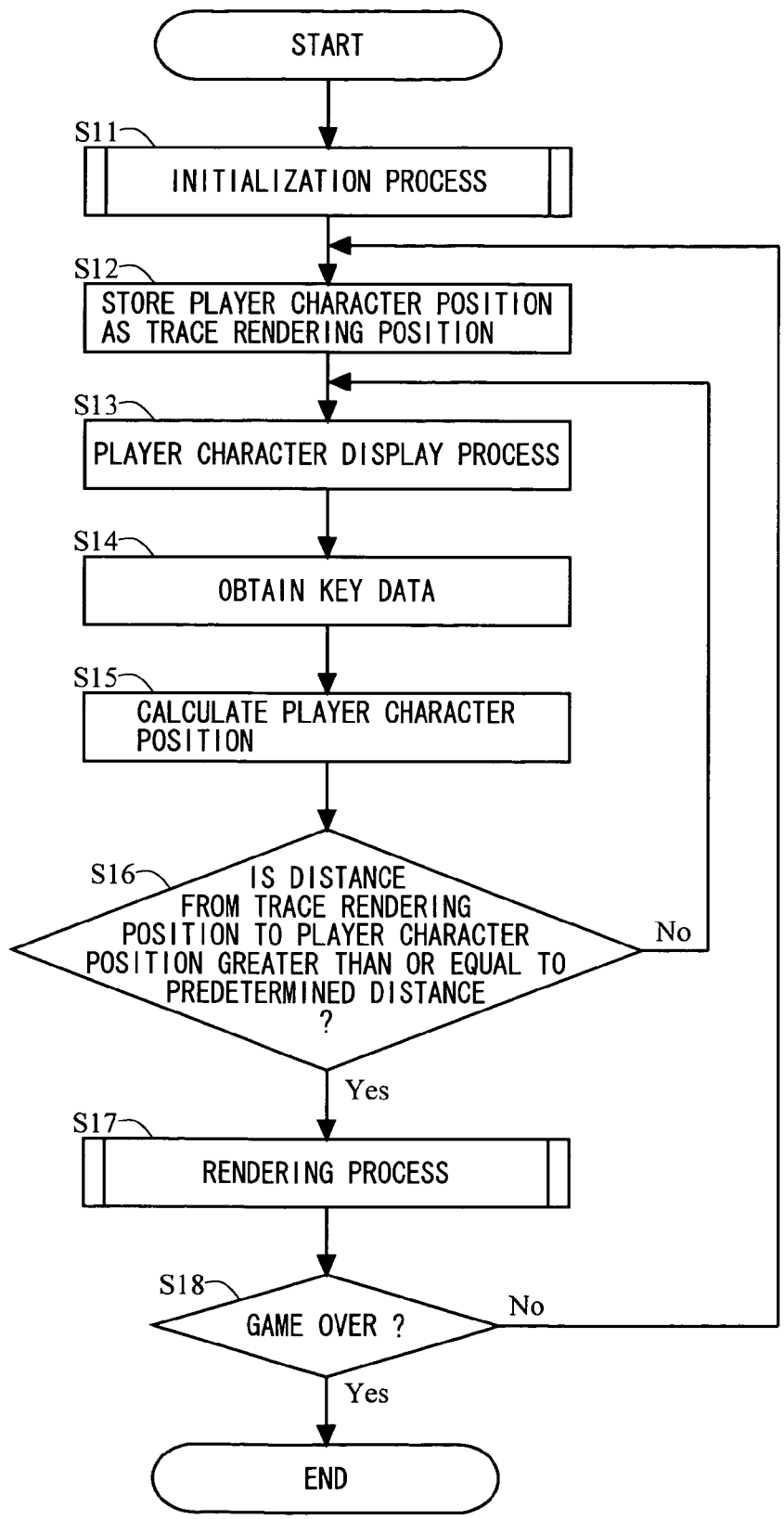
FIG. 10 is a flow chart showing the game process performed by the game device main unit 5 of FIG. 1.
Figure 11:
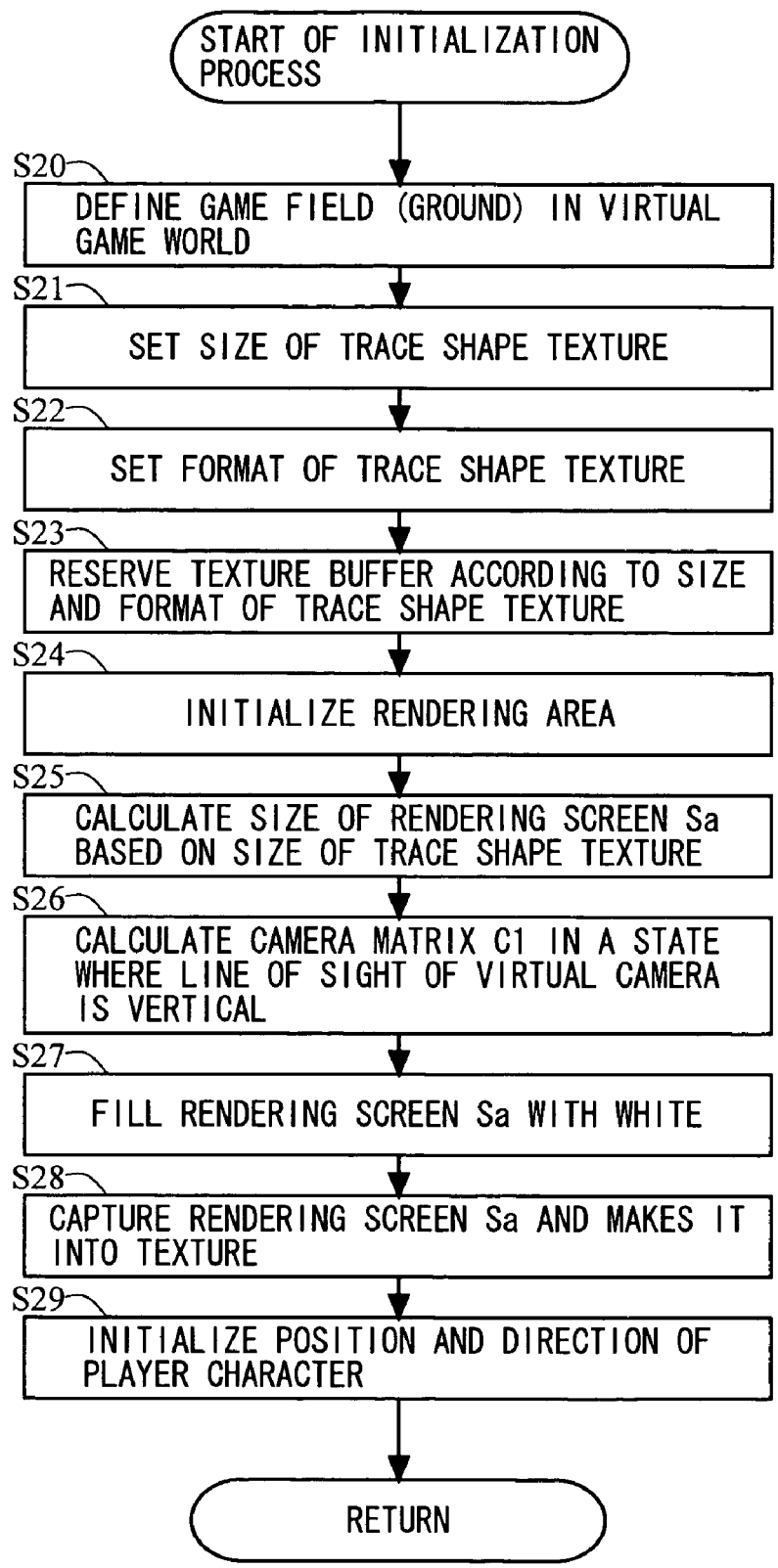
FIG. 11 shows, in detail, a subroutine of step 11 in FIG. 10 for the initialization process.
Figure 12:
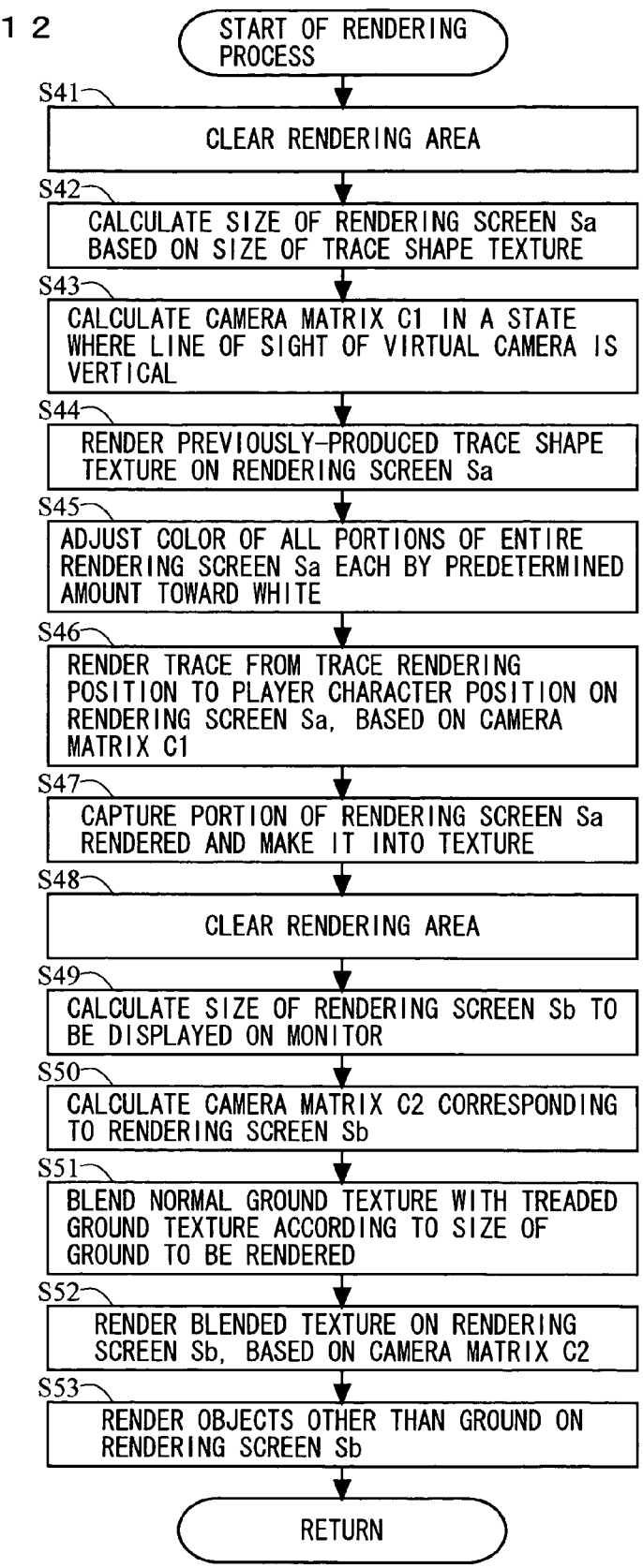
FIG. 12 shows, in detail, a subroutine of step 17 in FIG. 10 for the rendering process.
Figure 13:
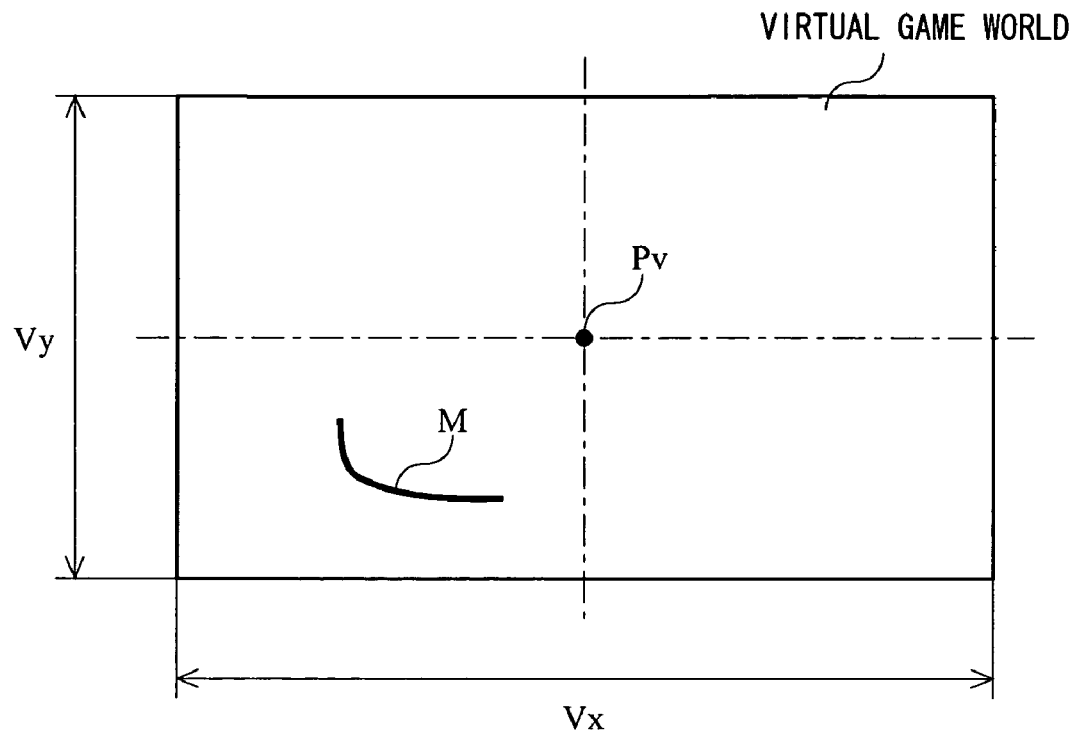
FIG. 13 shows an example of the relationship between a virtual game world and a trace shape texture Tsa.
Figure 13:
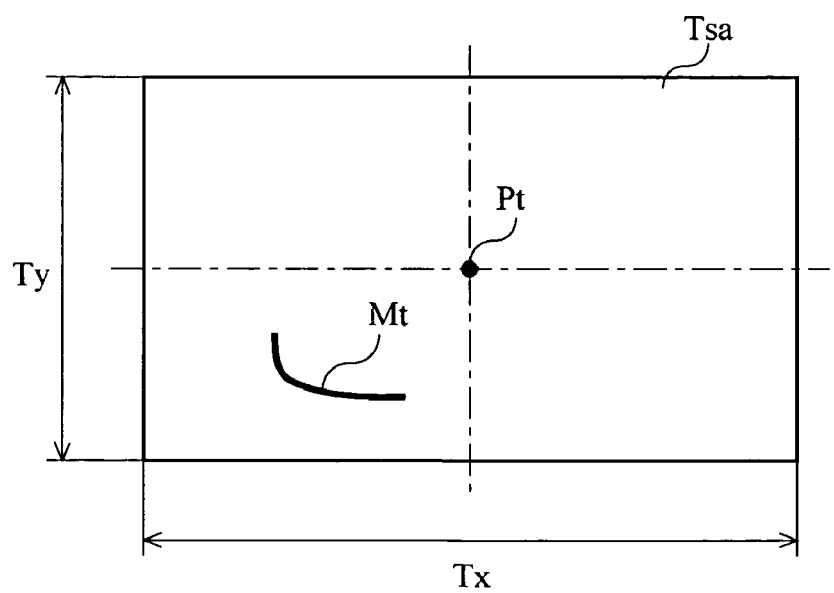
Figure 14A:
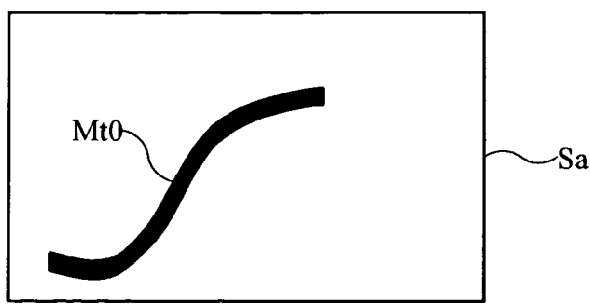
FIG. 14A shows an example of a first step of producing a trace shape texture by way of the rendering process shown in FIG. 12.
Figure 14B:
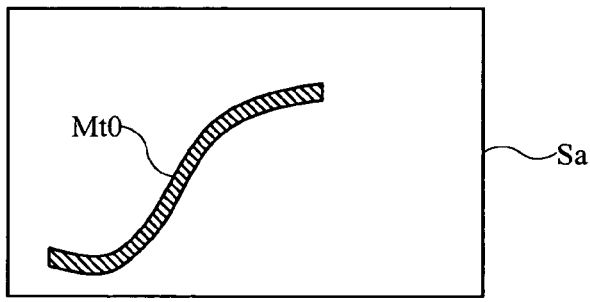
FIG. 14B shows an example of a second step of producing a trace shape texture by way of the rendering process shown in FIG. 12.
Figure 14C:
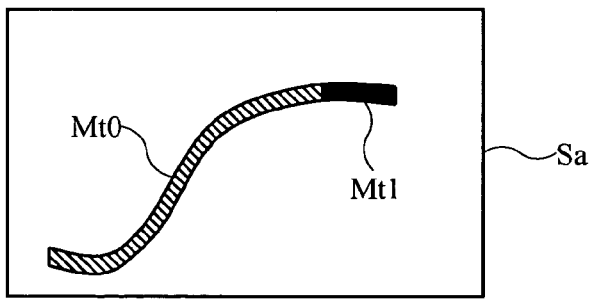
FIG. 14C shows an example of a third step of producing a trace shape texture by way of the rendering process shown in FIG. 12.
Figure 14D:
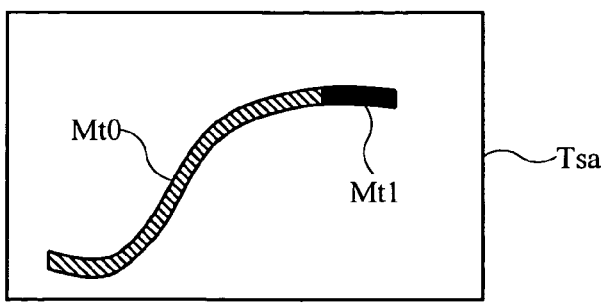
FIG. 14D shows an example of a fourth step of producing a trace shape texture by way of the rendering process shown in FIG. 12.
Figure 15:
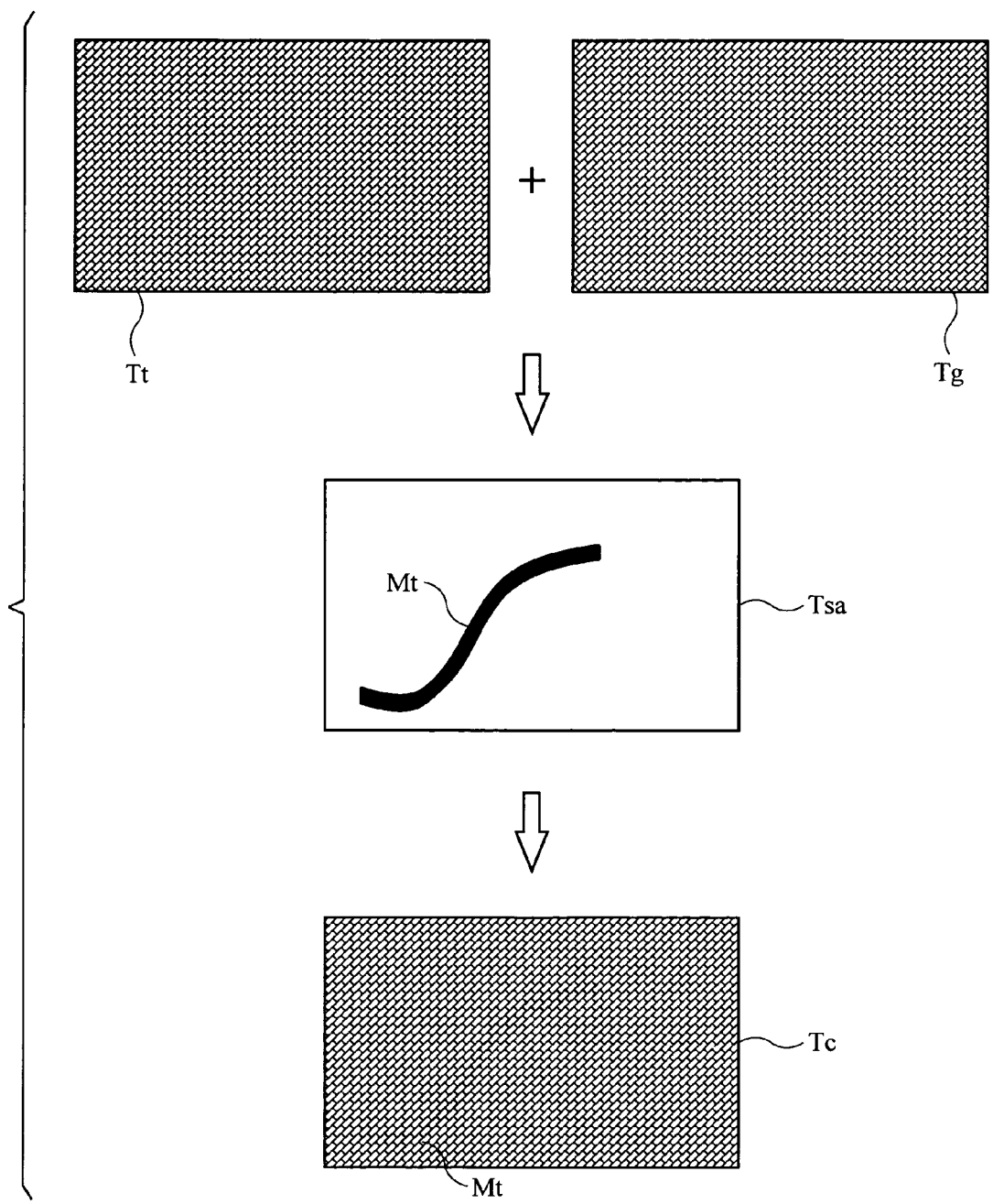
FIG. 15 shows an example of how a blended texture is produced by way of the rendering process shown in FIG. 12.

Referring now to FIGS. 10 to 15, the details of the game process performed by the game device main unit 5 will be described. FIG. 10 is a flow chart showing the game process performed by the game device main unit 5 of FIG. 1. FIG. 11 shows, in detail, a subroutine of step 11 in FIG. 10 for the initialization process. FIG. 12 shows, in detail, a subroutine of step 17 in FIG. 10 for the rendering process. FIG. 13 shows an example of the relationship between a virtual game world and a trace shape texture Tsa. FIGS. 14A to 14D each show an example of a step of producing a trace shape texture by way of the rendering process shown in FIG. 12. FIG. 15 shows an example of how a blended texture is produced by way of the rendering process shown in FIG. 12. In the flow charts of FIGS. 10 to 12, parts of the game process for rendering the trace in the virtual game world are mainly described, and other parts of the game process that are not directly related to the certain exemplary embodiments described herein are not described in detail. In FIGS. 10 to 12, each step performed by the CPU 30 is denoted by an abbreviation "S" plus the step number.

When the power of the game device main unit 5 is turned ON, the CPU 30 of the game device main unit 5 executes a boot program stored in a boot ROM (not shown), thus initializing various units such as the main memory 33. The game program stored in the optical disc 4 is loaded to the main memory 33, and the CPU 30 starts executing the game program. The flow charts of FIGS. 10 to 12 show the process performed after the completion of the process described above.

Referring to FIG. 10, the CPU 30 performs an initialization process (step 11), and the process proceeds to the next step. Referring now to FIG. 11, the initialization process performed in step 11 will be described.

Referring to FIG. 11, the CPU 30 defines the game field (ground) of the virtual game world where the player plays the game (step 20). Then, the CPU 30 sets the size of the texture (the trace shape texture), which is used for drawing the trace of the movement of the player character PC in the virtual game world, according to the size of the ground on which the trace may possibly be rendered in the virtual game world (step 21), and the process proceeds to the next step. For example, where the size of the ground on which the trace may possibly be rendered in the virtual game world is Vy (vertical) by Vx (horizontal) as shown in FIG. 13, the trace shape texture Tsa is defined to have a size of Ty (vertical) by Tx (horizontal). A reference point Pv is defined at the center of the Vy-by-Vx area of the ground, and another reference point Pt is defined at the center of the Ty-by-Tx trace shape texture Tsa, wherein the reference points Pv and Pt represent an identical point.

Then, the CPU 30 sets the format of the trace shape texture Tsa (step 22), and the process proceeds to the next step. For example, as the format of the trace shape texture Tsa, the CPU 30 sets a texture format using the luminance I and the α value A (e.g., the IA8 format).

Then, based on the size and the format of the trace shape texture Tsa, the CPU 30 reserves a texture buffer in a storage area (e.g., the main memory 33 or a memory dedicated for image processing operations) (step 23). Then, the CPU 30 initializes the rendering areas, such as the frame buffer and the texture buffer (step 24), and the process proceeds to the next step. For example, the CPU 30 initializes the rendering area by setting the RGBA value of the rendering area to RGBA={0,0,0,0}.

Then, based on the size of the trace shape texture Tsa, the CPU 30 calculates the size of the rendering screen Sa, which is used for producing the trace shape texture Tsa (step 25), and sets the rendering screen Sa in the rendering area. Then, the CPU 30 calculates the camera matrix C1 such that the line of sight of the virtual camera is vertical to the game field (ground) (step 26) and stores the calculated matrix in the camera matrix data Dj, and the process proceeds to the next step. For example, the camera matrix C1 can be calculated by using a projection matrix, such as a perspective projection matrix or an orthogonal projection matrix, depending on how the virtual camera projects an image.

Then, the CPU 30 initializes the rendering screen Sa by filling the rendering screen Sa with white (step 27). For example, the CPU 30 fills the rendering screen Sa with white by setting the RGBA value of the rendering screen Sa to RGBA={255,255,255,255}. Then, the CPU 30 captures the rendering screen Sa, which has been filled with white in step 27, and makes it into a texture. Then, the CPU 30 stores the obtained texture as the trace shape texture Tsa in the trace shape texture data De (step 28). For example, the CPU 30 makes the rendering screen Sa into a texture by converting the R component thereof to the value of the luminance I and the G component thereof to the α value A. Then, the CPU 30 initializes the position and direction of the player character PC and stores them in the player character position data Db and the player character direction data Dc (step 29) to exit the subroutine.

Referring back to FIG. 10, after the initialization process of step 11, the CPU 30 sets the current position of the player character PC in the virtual game world to be at the front end of the trace M (the trace rendering position) and stores the current position in the trace rendering position data Dd (step 12). Then, according to the current position and direction of the player character PC, the CPU 30 places the player character PC in the game field and displays a game image as viewed from the virtual camera on the monitor 2 (step 13). Then, the CPU 30 obtains the key data (step 14), calculates the position and direction of the player character PC in the virtual game world according to the key data to update the player character position data Db and the player character direction data Dc (step 15), and the process proceeds to the next step. For example, where a game image as shown in FIG. 8 is displayed on the monitor 2, if the player presses the rightward portion of the cross-shaped key 72a, the direction of the player character PC is set to right, whereby the player character PC thereafter moves rightward in the game field at a constant speed. When the player releases the cross-shaped key 72a, the player character PC stops in the game field while maintaining the current direction. In step 15, the position and direction of the player character PC are calculated based on such movement of the player character PC.

Then, the CPU 30 determines whether the distance in the virtual game world from the trace rendering position stored in step 12 to the current position of the player character PC is greater than or equal to a predetermined distance (step 16). If the CPU 30 determines that the distance from the trace rendering position to the position of the player character PC is greater than or equal to the predetermined distance, the process proceeds to step 17. If the CPU 30 determines that the distance from the trace rendering position to the position of the player character PC is less than the predetermined distance, the process returns to step 13 to repeat the process.

In step 17, the CPU 30 performs the rendering process, and the process proceeds to the next step. Referring now to FIG. 12, the rendering process performed by the CPU 30 will be described.

Referring to FIG. 12, the CPU 30 clears the rendering area (step 41). For example, the CPU 30 clears the rendering area by setting the RGBA value of the rendering area to RGBA={0,0,0,0}. Then, the CPU 30 calculates the size of the rendering screen Sa based on the size of the trace shape texture Tsa stored in the trace shape texture data De (step 42), and sets the rendering screen Sa in the rendering area. Then, the CPU 30 calculates the camera matrix C1 such that the line of sight of the virtual camera is vertical to the game field (ground) (step 43) and stores the calculated matrix in the camera matrix data Dj, and the process proceeds to the next step.

Then, the CPU 30 renders the trace shape texture Tsa, which has been produced in the previous process cycle, on the rendering screen Sa (step 44), and the process proceeds to the next step. For example, where a trace Mt0 is rendered in the trace shape texture Tsa as shown in FIG. 14A, the trace Mt0 is rendered on the rendering screen Sa in step 44.

Then, the CPU 30 adjusts the color of all portions the entire rendering screen Sa each by a predetermined amount toward white (step 45), and the process proceeds to the next step. For example, where the CPU 30 employs a texture format using the luminance I and the α value A, white can be represented by I=255 and A=255, and black by I=0 and A=255. In such a case, the CPU 30 adjusts the color of the entire rendering screen Sa toward white by increasing the value of the luminance I of all portions of the entire rendering screen Sa each by a predetermined amount. Through the process of step 45, the color of the trace Mt0 rendered on the rendering screen Sa is adjusted by a predetermined amount toward white as shown in FIG. 14B. In FIG. 14B, the trace Mt0 whose color has been adjusted toward white is represented by hatching.

Then, the CPU 30 renders the trace from the trace rendering position to the current position of the player character PC on the rendering screen Sa based on the camera matrix C1 (step 46), and the process proceeds to the next step. For example, a new trace Mt1 is rendered in black extending from the front end of the trace Mt0 rendered on the rendering screen Sa as shown in FIG. 14C.

An example of how to calculate the positional relationship between the virtual game world and the rendering screen Sa will now be described. As described above with reference to FIG. 13, the Ty-by-Tx trace shape texture Tsa is defined corresponding to the Vy-by-Vx ground in the virtual game world. The reference points Pv and Pt are defined at their centers, representing an identical point. Thus, a position in the trace shape texture Tsa corresponding to a position in the Vy-by-Vx ground in the virtual game world can be calculated based on the vertical and horizontal size ratios therebetween (i.e., Vy:Ty and Vx:Tx). For example, the position (y0, x0) on the ground of the virtual game world with respect to the reference point Pv corresponds to the position (y0*(Ty/Vy), x0*(Tx/Vx)) in the trace shape texture Tsa with respect to the reference point Pt. With such a relationship, the trace M in the virtual game world shown in FIG. 13 corresponds to a trace Mt in the trace shape texture Tsa. The rendering screen Sa is defined according to the size of the trace shape texture Tsa, and the trace shape texture Tsa is rendered on the rendering screen Sa in step 44. Therefore, in step 46, the position on the rendering screen Sa corresponding to the position data in the virtual game world can be calculated by using such a relationship.

Then, the CPU 30 captures the rendering screen Sa rendered in step 46, and makes it into a texture. Then, the CPU 30 stores the obtained texture as the trace shape texture Tsa to update the trace shape texture data De (step 47). For example, as shown in FIG. 14D, the rendering screen Sa with the traces Mt0 and Mt1 rendered thereon is captured to produce a new trace shape texture Tsa. As is apparent from FIGS. 14A and 14D, the color of the trace, which have been rendered on the trace shape texture Tsa, is adjusted by a predetermined amount toward white, and a new trace portion is added according to the movement of the player character PC, thus producing the new trace shape texture Tsa.

Then, the CPU 30 clears the rendering area (step 48). For example, the CPU 30 clears the rendering area by setting the RGBA value of the rendering area to RGBA={0,0,0,0}. Where the rendering area is overwritten by a process to be described later, whereby what is rendered on the screen Sa is erased, the process of step 48 may be omitted. Then, based on the size of the game image to be displayed on the monitor 2, the CPU 30 calculates the size of the rendering screen Sb, which is used for producing the game image (step 49), and sets the rendering screen Sb in the rendering area. Then, the CPU 30 calculates the camera matrix C2 of the virtual camera corresponding to the rendering screen Sb (step 50) and stores the calculated matrix in the camera matrix data Dj, and the process proceeds to the next step.

Then, according to the shape and shade of the trace Mt represented by the trace shape texture Tsa stored in the trace shape texture data De, the CPU 30 blends the normal ground texture with the treaded ground texture according to the size of the ground to be rendered (step 51), and the process proceeds to the next step.

Referring to FIG. 15, the treaded ground texture data Dg stores a treaded ground texture Tt, which is used for representing trace portions of the ground. The trace is displayed in a color closer to the color represented by the treaded ground texture Tt as the color of the trace Mt represented by the trace shape texture Tsa is closer to black. The normal ground texture data Df stores a normal ground texture Tg representing the normal ground, other than the trace, and the trace is displayed in a color closer to that represented by the normal ground texture Tg as the color of the trace Mt represented by the trace shape texture Tsa is closer to white. The treaded ground texture Tt, the normal ground texture Tg and the trace shape texture Tsa are blended together to obtain a blended texture Tc, which is stored in the blended texture data Dh.

Then, the CPU 30 renders the blended texture Tc, which has been produced in step 51, on the rendering screen Sb (step 52). Then, the CPU 30 renders objects other than the ground on the rendering screen Sb and displays the game image on the monitor 2 (step 53), and exits the subroutine. In step 52, the blended texture Tc may be mapped onto ground polygons representing the ground shape in the virtual game world.

Referring back to FIG. 10, after the rendering process in step 17, the CPU 30 determines whether the game is over (step 18). For example, the game is ended when a game-over condition is met or when the player manually ends the game. If the game is not to be ended, the CPU 30 returns to step 12 to repeat the process. If the game is to be ended, the CPU 30 exits the process shown in the flow chart.

Thus, with the game device 3 of the present embodiment, before the virtual game world is rendered, only the trace is rendered, and the rendered image is made into a texture, which is displayed while being blended with the ground. Therefore, the processing speed and the memory cost required for rendering the trace can be kept constant, irrespective of the size of the trace to be rendered. Moreover, the trace is made into a texture which is blended with the game field, whereby it is possible to render the trace that completely fits the game field.

The pattern of the trace to be drawn in the game field may be any of various patterns, including a group of shapes as shown in FIG. 8 (i.e., a series of solid-color rectangles), or a continuous curve as shown in FIG. 15. For example, the group of shapes may be a series of equally-spaced shapes, e.g., heart shapes or polygonal shapes. The direction of the movement of the player character PC can be indicated by using shapes, which when arranged in an equally-spaced continuous arrangement can represent a particular direction (e.g., arrows, odd-number-sided polygonal shapes, heart shapes, etc.). Moreover, traces of different shapes may be used for different player characters PC.

For example, where the trace is rendered with a group of identical shapes arranged in an equally-spaced continuous arrangement, the predetermined distance used as a threshold in step 16 is determined so that one such shape can be added within the predetermined distance. Then, it is possible to realize a rendering process in which one new trace shape appears in the game field each time the player character PC moves over the predetermined distance.

Where the trace is rendered with a continuous curve, or the like, it is possible to realize a rendering process in which the trace appears in real time following the movement of the player character PC. In such a case, the predetermined distance used as a threshold in step 16 is determined to be the minimum unit of distance in the rendering process (e.g., one pixel) or zero. Then, it is possible to realize a rendering process in which the trace is drawn from under the player character PC without being interrupted as the player character PC moves.

By repeating the rendering process of step 17, the color of each portion of the trace is lightened gradually with time until that portion disappears, whereby portions of the trace that are closer to the rear end thereof are lighter in color. Alternatively, the trace may be displayed in the game field in such a manner that it is kept as it first appears in the game field and does not gradually disappear with time. For example, this can be realized by omitting step 45.

An essential technique of certain exemplary embodiments is the use of a texture obtained by blending a trace with the game field in the rendering process, and the manner in which the player character PC is moved around is not limited to any particular manner. For example, the direction of the player character PC may be determined by the operation of the cross-shaped key 72a while the moving speed thereof is determined according to other control sections 72 being pressed. Alternatively, the direction and the moving speed of the player character PC may be determined according to control sections 72 other than the cross-shaped key 72a being pressed.

As described above, the controller 7 is provided with the image capturing/processing section 74 and the acceleration sensor 701. For example, if the image capturing/processing section 74 uses the captured image obtained by capturing the image of the markers 8L and 8R, it is possible to calculate the position on the monitor 2 being pointed at by the controller 7. The position pointed at by the controller 7 can be converted to a position in the virtual game world, and the player character PC can be moved toward the converted position. Moreover, the orientation, the movement, the position, etc., of the controller 7 can be calculated by additionally processing the acceleration signal outputted from the acceleration sensor 701 as described above. The player character PC may be moved around based on the orientation, the movement, the position, etc., of the controller 7.

While the game device main unit 5 capable of performing the rendering process of the certain exemplary embodiments is applied to the game system 1 in the above description, it is also applicable to other types of information processing devices such as ordinary personal computers.

Moreover, the controller 7 and the game device main unit 5 are connected to each other via wireless communications in the above description, the controller 7 and the game device main unit 5 may be electrically connected to each other via a cable. In such a case, a cable extending from the controller 7 may be connected to the connection terminal of the game device main unit 5.

The shape of the controller 7, and the shape, number and arrangement, etc., of the control sections 72 provided on the controller 7, are all illustrative, and it is understood that the certain exemplary embodiments described herein can be carried out with any other suitable shape, number and arrangement.

Note that the game program of certain exemplary embodiments may be supplied to the game device main unit 5 via a wired or wireless communications line, instead of via an external storage medium such as the optical disc 4. Alternatively, the game program may be pre-stored in a non-volatile storage device inside the game device main unit 5. The information storage medium for storing the game program may be a non-volatile semiconductor memory, as well as a CD-ROM, a DVD or any other suitable type of an optical disc medium.

With the storage medium storing a game program and the game device of certain exemplary embodiments, the processing speed and the memory cost required for rendering the trace can be kept constant, irrespective of the size of the trace to be rendered. Thus, certain exemplary embodiments are useful in a game device or a game program, where a trace is displayed in the game field, or the like.

While certain exemplary embodiments have been described in detail, the foregoing description is in all aspects illustrative and not restrictive. It is understood that numerous other modifications and variations can be devised without departing from the scope of the certain exemplary embodiments described herein.

What is claimed is:

1. A storage medium storing a game program to be executed by a computer of a game device for displaying, on a display device, an object moved around in a virtual game world, the game program instructing the computer to perform:

calculating a position of the object in the virtual game world;

updating trace shape information representing a shape of a trace along which the object has moved across a game field in the virtual game world based on a change in the calculated position, and storing the updated trace shape information in a memory;

producing a ground image by blending together an image of the game field in the virtual game world with the trace and that without the trace based on the trace shape information;

rendering the game field in the virtual game world by using the ground image;

placing the object at the calculated position; and displaying the virtual game world in which the object has been placed on the display device, wherein the trace shape information is an image in which the trace shape is indicated by a color shade, and a blending ratio at which the image of the game field with the trace is blended with that without the trace and is indicated by the color shade, and wherein the trace shape information is an image indicating that a stronger color shade provides a higher blending ratio at which the image of the game field with the trace is blended with that without the trace.

2. The storage medium storing a game program according to claim 1, wherein the placing of the object at the calculated position, the updating of the trace shape information, the producing the ground image, the rendering of the game field, and the displaying of the virtual game world are repeated by the computer on a predetermined processing cycle.

3. The storage medium storing a game program according to claim 1, wherein the trace shape information is image data such that an area of the game field where the trace is present is represented in a first color and an area of the game field where the trace is absent is represented in a second color different from the first color, and the blending ratio at which the image of the game field with the trace is blended with that without the trace is represented in terms of a strength of the first color.

4. The storage medium storing a game program according to claim 1, wherein the ground image is a ground texture attached to a surface of an object representing a ground, and the trace shape information is a texture indicating the shape of a trace and the blending ratio.

5. A storage medium storing a game program to be executed by a computer of a game device for displaying, on a display device, an object moved around in a virtual game world, the game program instructing the computer to perform:
  calculating a position of the object in the virtual game world;
  updating trace shape information representing a shape of a trace along which the object has moved across a game field in the virtual game world based on a change in the calculated position, and storing the updated trace shape information in a memory;
  producing a ground texture by blending together an image of the game field in the virtual game world with the trace and that without the trace based on the trace shape information;
  rendering the game field in the virtual game world by using the ground texture;
  placing the object at the calculated position; and
  displaying the virtual game world in which the object has been placed on the display device,
  wherein the trace shape information indicates a blending ratio at which the image of the game field with the trace is blended with that without the trace, and
  wherein in the updating of the trace shape information, the trace shape information is updated while the blending ratio at which the image of the game field with the trace is blended is lowered for portions of the trace that have already been rendered and displayed on the display device.

6. The storage medium storing a game program according to claim 5, wherein the placing of the object at the calculated position, the updating of the trace shape information, the producing the ground texture, the rendering of the game field, and the displaying of the virtual game world are repeated by the computer on a predetermined processing cycle.

7. The storage medium storing a game program according to claim 5, wherein the trace shape information is image data such that an area of the game field where the trace is present is represented in a first color and an area of the game field where the trace is absent is represented in a second color different from the first color, and the blending ratio at which the image of the game field with the trace is blended with that without the trace is represented in terms of a strength of the first color.

8. The storage medium storing a game program according to claim 5, wherein the trace shape information is a texture indicating the shape of a trace and the blending ratio.

9. A game device for displaying an object moved around in a virtual game world on a display device, the game device comprising:
  an object position calculator for calculating a position of the object in the virtual game world;
  a trace shape information updater for updating trace shape information representing a shape of a trace along which the object has moved across a game field in the virtual game world based on a change in the calculated position, and storing the updated trace shape information in a storage device;
  a ground texture producer for producing a ground texture by blending together an image of the game field in the virtual game world with the trace and that without the trace based on the trace shape information;
  a game field renderer for rendering the game field in the virtual game world by using the ground texture;
  an object placer for placing the object at the calculated position; and
  a display controller for displaying the virtual game world in which the object has been placed on the display device,
  wherein the trace shape information indicates a blending ratio at which the image of the game field with the trace is blended with that without the trace, and
  wherein the trace shape information updater updates the trace shape information while the blending ratio at which the image of the game field with the trace is blended is lowered for portions of the trace that have already been rendered and displayed on the display device.

10. The game device according to claim 9, wherein the processes performed by the object position calculator, the trace shape information updater, the ground texture producer, the game field renderer, and the display controller are repeated on a predetermined processing cycle.

11. The game device according to claim 9, wherein the trace shape information is image data such that an area of the game field where the trace is present is represented in a first color and an area of the game field where the trace is absent is represented in a second color different from the first color, and the blending ratio at which the image of the game field with the trace is blended with that without the trace is represented in terms of a strength of the first color.

12. A method for displaying an object moved around in a virtual game world on a display device, the method comprising:
  calculating a position of the object in the virtual game world;
  updating trace shape information representing a shape of a trace along which the object has moved across a game field in the virtual game world based on a change in the calculated position, and storing the updated trace shape information in a memory;
  producing a ground texture by blending together an image of the game field in the virtual game world with the trace and that without the trace based on the trace shape information;
  rendering the game field in the virtual game world by using the ground texture;
  placing the object at the calculated position; and
  displaying the virtual game world in which the object has been placed on the display device,
  wherein the trace shape information indicates a blending ratio at which the image of the game field with the trace is blended with that without the trace, and
  wherein in the updating of the trace shape information, the trace shape information is updated while the blending ratio at which the image of the game field with the trace is blended is lowered for portions of the trace that have already been rendered and displayed on the display device.

13. A method for displaying an object moved around in a virtual game world on a display device:
- calculating a position of the object in the virtual game world;
- updating trace shape information representing a shape of a trace along which the object has moved across a game field in the virtual game world based on a change in the calculated position, and storing the updated trace shape information in a memory;
- producing a ground image by blending together an image of the game field in the virtual game world with the trace and that without the trace based on the trace shape information;
- rendering the game field in the virtual game world by using the ground image;
- placing the object at the calculated position; and
- displaying the virtual game world in which the object has been placed on the display device,
- wherein the trace shape information is an image in which the trace shape is indicated by a color shade, and a blending ratio at which the image of the game field with the trace is blended with that without the trace and is indicated by the color shade, and
- wherein the trace shape information is an image indicating that a stronger color shade provides a higher blending ratio at which the image of the game field with the trace is blended with that without the trace.

14. A game device for displaying an object moved around in a virtual game world on a display device, the game device comprising:
- an object position calculator for calculating a position of the object in the virtual game world;
- a trace shape information updater for updating trace shape information representing a shape of a trace along which the object has moved across a game field in the virtual game world based on a change in the calculated position, and storing the updated trace shape information in a memory;
- a ground image producer for producing a ground image by blending together an image of the game field in the virtual game world with the trace and that without the trace based on the trace shape information;
- a game field renderer for rendering the game field in the virtual game world by using the ground image;
- an object placer for placing the object at the calculated position; and
- a display controller for displaying the virtual game world in which the object has been placed on the display device,
- wherein the trace shape information is an image in which the trace shape is indicated by a color shade, and a blending ratio at which the image of the game field with the trace is blended with that without the trace and is indicated by the color shade, and
- wherein the trace shape information is an image indicating that a stronger color shade provides a higher blending ratio at which the image of the game field with the trace is blended with that without the trace.

* * * * *